(12) United States Patent
Sudbrink et al.

(10) Patent No.: US 9,986,674 B2
(45) Date of Patent: Jun. 5, 2018

(54) TILLAGE ELECTRO-HYDRAULIC DESIGN AND LAYOUT ON RAISE AND LOWER SYSTEM ON A FRONT FOLD MACHINE

(71) Applicant: CNH Industrial America LLC, New Holland, PA (US)

(72) Inventors: Matthew R. Sudbrink, Metamora, IL (US); Kena Shah, Woodridge, IL (US); Dean A. Knobloch, Tucson, AZ (US); James W. Henry, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 15/086,797

(22) Filed: Mar. 31, 2016

(65) Prior Publication Data

US 2016/0205862 A1 Jul. 21, 2016

Related U.S. Application Data

(63) Continuation-in-part of application No. 14/528,345, filed on Oct. 30, 2014, now Pat. No. 9,516,798, and a continuation-in-part of application No. 14/528,356, filed on Oct. 30, 2014, now Pat. No. 9,554,497, application No. 15/086,797, which is a continuation-in-part of application No. 14/528,236, filed on Oct. 30, 2014, now Pat. No. 9,706,699, (Continued)

(51) Int. Cl.
*A01B 63/22* (2006.01)
*A01B 73/06* (2006.01)
*A01B 73/02* (2006.01)

(52) U.S. Cl.
CPC ............ *A01B 63/22* (2013.01); *A01B 73/065* (2013.01); *A01B 73/02* (2013.01)

(58) Field of Classification Search
CPC ..... A01B 73/02; A01B 73/048; A01B 73/065; A01B 73/005; A01B 73/00; A01B 73/06; A01B 73/067; A01B 63/22
See application file for complete search history.

(56) References Cited

U.S. PATENT DOCUMENTS

| | | | | |
|---|---|---|---|---|
| 4,821,806 A | * | 4/1989 | Winter | A01B 63/22 172/4 |
| 5,427,182 A | * | 6/1995 | Winter | A01B 63/22 172/2 |

(Continued)

*Primary Examiner* — Matthew D. Troutman
(74) *Attorney, Agent, or Firm* — Rebecca L. Henkel; Rickard K. DeMille

(57) ABSTRACT

An agricultural tillage implement has a main frame section, a left wing section, and a right wing section. Lift wheels and gauge wheels are actuated by hydraulic cylinders supplied by a hydraulic system. Solenoid valves connect groups of hydraulic cylinders to each other and to bypass circuits. The solenoid valves and the bypass circuits function to selectively allow coordinated control and individual control of the lift wheels and gauge wheels. The hydraulic system has at least one hydraulic flow divider and combiner dividing hydraulic flow and pressure between at least one left hydraulic circuit and at least one right hydraulic circuit. The at least one hydraulic flow divider and combiner functions to coordinate the motion of the left rear lift wheels and gauge wheels, and the right rear lift wheels and gauge wheels, and may be overridden by bypass valves.

18 Claims, 5 Drawing Sheets

Related U.S. Application Data application No. 15/086,797, which is a continuation-in-part of application No. 14/528,535, filed on Oct. 30, 2014, now Pat. No. 9,596,799, application No. 15/086,797, which is a continuation-in-part of application No. 14/558,498, filed on Dec. 2, 2014, now Pat. No. 9,609,799.

(60) Provisional application No. 61/914,502, filed on Dec. 11, 2013, provisional application No. 61/914,594, filed on Dec. 11, 2013, provisional application No. 61/914,686, filed on Dec. 11, 2013.

(56) References Cited

U.S. PATENT DOCUMENTS

| | | | | |
|---|---|---|---|---|
| 5,957,218 A * | 9/1999 | Noonan | A01B 63/10 | 172/239 |
| 6,129,157 A * | 10/2000 | Noonan | A01B 63/10 | 172/239 |
| 6,141,612 A * | 10/2000 | Flamme | A01B 63/1117 | 111/177 |
| 6,415,873 B1 * | 7/2002 | Hudgins | A01B 35/16 | 172/311 |
| 6,698,523 B2 * | 3/2004 | Barber | A01B 63/22 | 172/239 |
| 9,363,939 B2 * | 6/2016 | Henry | A01B 63/22 | |
| 9,609,799 B2 * | 4/2017 | Henry | A01B 63/22 | |
| 2014/0034342 A1 * | 2/2014 | Friggstad | A01B 73/067 | 172/663 |
| 2015/0156952 A1 * | 6/2015 | Henry | A01B 63/22 | 172/1 |

\* cited by examiner

TILLAGE ELECTRO-HYDRAULIC DESIGN AND LAYOUT ON RAISE AND LOWER SYSTEM ON A FRONT FOLD MACHINE

CROSS REFERENCE TO RELATED APPLICATIONS

This is a continuation-in-part application based upon U.S. Non-Provisional patent application Ser. No. 14/528,345, entitled "FOLDING SEQUENCE OF ENTIRE AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,356, entitled "FRONT FOLDING ARRANGEMENT FOR AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,236, entitled "DRAFT LINKAGE CONFIGURATION", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed on Dec. 11, 2013 which is incorporated herein by reference; U.S. Non-Provisional patent application Ser. No. 14/528,535, entitled "DRAFT TUBE SEQUENCING FOR AN AGRICULTURAL TILLAGE IMPLEMENT", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed Dec. 11, 2013 which is incorporated herein by reference; and U.S. patent application Ser. No. 14/558,498, entitled "REMOTE LEVELING OF TILLAGE IMPLEMENTS USING THREE WAY VALVES", filed on Dec. 2, 2014, which is a non-provisional of U.S. Provisional Application Ser. No. 61/914,686, entitled "REMOTE LEVELING OF TILLAGE IMPLEMENTS USING THREE WAY VALVES, filed on Dec. 11, 2013 which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, drag tines, etc., or any combination thereof.

Such tillage implements have been constructed with large lateral spans to realize greater efficiency and speed. Tillage implements with significant lateral spans often have many different joints and are usually articulated to enable transport to and between fields. When such large tillage implements are used, it is important to maintain uniform and level tool contact with the soil. The desirable outcome is a uniform physical depth of the tillage and a uniform entry of the disk blades or harrows into the soil. The need to have a level positioning of the implement is made more challenging with the common use of hydraulic actuators which control the depth of penetration of the disk blades or other tools. In current practice, hydraulic actuators are connected in series and it is possible through normal operation for hydraulic fluid leakage to make the actuators out of sync with one another. In addition, field conditions, such as wheel loading and other variables, require an adjustment to the synchronization of the different sections of the tillage implement, thereby requiring the operator to dismount from a tractor and make manual adjustments.

It is current practice to partially counter this occurrence by fully elevating the implement to the point where bypass lands in the actuators allow full flow of hydraulic fluid to pass through the actuators and again synchronize the multiple units. However, this adds an additional step to the operation, particularly in the field, thereby decreasing the efficiency and speed with which the particular task is accomplished.

Further, as agricultural tillage implements become wider and wider over time, it becomes more difficult to keep the transport size of the implement within manageable limits. It also becomes more difficult to convert the agricultural tillage implement from an operating configuration to a transport configuration, or vice versa, without requiring too much time and difficulty on the part of the operator. It is desirable for the agricultural tillage implement to be converted from one mode to the other while the operator remains within the operator cab, through the use of hydraulics or other actuators. It is also desirable for the agricultural tillage implement to remain within certain geometric constraints so that it is not necessary to use a separate "escort vehicle" or the like when traveling on public roads. It is further desirable that any hydraulic system used to convert the agricultural tillage implement from one mode to the other be as efficient, robust, as simple as possible, and operate in a coordinated fashion without excessive intervention by an operator.

What is needed in the art therefore, is an efficient apparatus and method for maintaining agricultural implements in a level position relative to the soil by individual adjustment but with a minimum of hydraulic lines. Further needed is such an apparatus and method that coordinates the motions of the agricultural implement.

SUMMARY OF THE INVENTION

The present invention provides an agricultural tillage implement with a main frame section and wing sections that may be foldable to a compact transport configuration. The agricultural tillage implement may be a field cultivator as illustrated in the drawings, or may be another type of tillage implement such as a disk harrow, a disk ripper, an in-line ripper, a vertical tillage implement, or a strip-till implement, as non-limiting examples. The agricultural tillage implement may use main lift wheels to raise and lower its main frame section, and may use toolbar lift wheels to raise and lower the wing sections. This raising and lowering of the wing sections may be in the context of transitioning to and from the operating configuration and transport configuration, and may further be in the context of controlling the depth of penetration of the tools that are attached to the shank frames, such as cultivator shanks and shovels. The present invention may further include a main shank frame and wing front shank frames that may fold upwards over the tool bar when in the transport configuration, and that may fold down and forward of the tool bar when in the operating configuration. The main shank frame and wing front shank frames may use gauge wheel assemblies that are operable to further level and support the shank frames and further control the depth of penetration of the tools that are attached to the shank frames.

The present invention provides embodiments of a hydraulic system that are operable to raise and lower the main frame section, the wing sections, the main shank frame, and the wing front shank frames in coordinated fashion when transitioning to and from the transport configuration and the operating configuration. The present invention further provides embodiments of a hydraulic system that are operable to control the depth and rate of penetration of tools attached to the shank frames while coordinating the raising and lowering of the main frame section, the wing sections, the main shank frame, and the wing front shank frames. The present invention further provides embodiments of a hydraulic system that are operable to override the coordinated raising and lowering of the main frame section, the wing sections, the main shank frame, and the wing front shank frames using the main lift wheels, toolbar lift wheels, and gauge wheels, in order to adjust the height of an individual or subset of the frame section, wing sections, and shank frames.

The present invention further provides embodiments that include a right wing front gauge wheel hydraulic subsystem, a left wing front gauge wheel hydraulic subsystem, a right wing rear lift wheel hydraulic subsystem, and a left wing rear lift wheel hydraulic subsystem. Hydraulic pressure and flow may be selectively split between the front and rear hydraulic subsystems, and may further be selectively split between the left and right front hydraulic subsystems and between the left and right rear hydraulic subsystems. This may be accomplished using hydraulic flow divider and combiners, the output of which may be selectively rejoined using solenoid valves. In this way, actuation of hydraulic cylinders within the left rear, right rear, left front, and right front hydraulic subsystems may be accomplished in coordinated fashion or may be accomplished selectively by rejoining the flow proceeding from appropriate hydraulic flow divider and combiners using the appropriate solenoid operated valves.

Each of the right wing front gauge wheel hydraulic subsystem, the left wing front gauge wheel hydraulic subsystem, the right wing rear lift wheel hydraulic subsystem, and the left wing rear lift wheel hydraulic subsystem has at least one hydraulic cylinder, four being presented as a non-limiting example, used to retract and extend the right front gauge wheels, the left front gauge wheels, the right rear lift wheels, and the left rear lift wheels, respectively. Appropriate hydraulic valves are arranged to selectively coordinate motion between the hydraulic cylinders of each subsystem, which may further be selectively controlled to individually actuate each of the hydraulic cylinders or subsets of the hydraulic cylinders of each subsystem. The present invention further provides embodiments including a controller operable to selectively control and energize each of the hydraulic valves in order to accomplish the selectively coordinated or individual movements of the hydraulic cylinders.

Embodiments of the present invention may further include hydraulic cylinder displacement detecting devices connected to the controller. The hydraulic cylinder displacement detecting devices may provide signals proportional to the displacement of the hydraulic cylinders, and may further provide signals reflecting the rate of change of displacement of the hydraulic cylinders. The hydraulic cylinder displacement detecting devices may provide the controller with information necessary to the selectively coordinated or individual movements of the hydraulic cylinders.

Embodiments of the present invention may further utilize the controller to calibrate the motion of the hydraulic cylinders using the hydraulic valves to cycle the hydraulic cylinders while taking readings from the hydraulic cylinder displacement detecting devices.

The invention in one form is directed to an agricultural tillage implement having a main frame section, a left wing section, and a right wing section. The left wing section and the right wing section are coupled with the main frame section. At least one first left rear lift wheel is connected to either the main frame section or the left wing section, and is actuated by a first left rear lift wheel hydraulic cylinder. At least one additional left rear lift wheel is connected to the left wing section and is actuated by at least one additional left rear lift wheel hydraulic cylinder. At least one first right rear lift wheel is connected to either the main frame section or the right wing section and is actuated by a first right rear lift wheel hydraulic cylinder. At least one additional right rear lift wheel is connected to the right wing section and is actuated by at least one additional right rear lift wheel hydraulic cylinder. A hydraulic system has at least one left hydraulic circuit that supplies hydraulic pressure and flow to at least one left wing hydraulic subsystem for actuating the at least one first left rear lift wheel and the at least one additional left rear lift wheel. The hydraulic system also has at least one right hydraulic circuit supplying hydraulic pressure and flow to at least one right wing hydraulic subsystem for actuating the at least one first right rear lift wheel and the at least one additional right rear lift wheel.

The at least one left wing hydraulic subsystem has a first left wing rear three way solenoid valve hydraulically connecting the first left rear lift wheel hydraulic cylinder to the at least one left hydraulic circuit. The at least one left wing hydraulic subsystem further has an additional left wing rear three way solenoid valve hydraulically connecting each additional left rear lift wheel hydraulic cylinder to the previous left rear lift wheel hydraulic cylinder. The at least one left wing hydraulic subsystem further has a left wing rear bypass circuit hydraulically interconnecting each left wing rear three way solenoid valve.

The at least one right wing hydraulic subsystem has a first right wing rear three way solenoid valve hydraulically connecting the first right rear lift wheel hydraulic cylinder to the at least one right hydraulic circuit. The at least one right wing hydraulic subsystem further has an additional right wing rear three way solenoid valve hydraulically connecting each additional right rear lift wheel hydraulic cylinder to the previous right rear lift wheel hydraulic cylinder. The at least one right wing hydraulic subsystem further has a right wing rear bypass circuit hydraulically interconnecting each right wing rear three way solenoid valve.

The three way solenoid valves and the bypass circuits function to selectively allow coordinated control and individual control of the lift wheels. The hydraulic system has at least one hydraulic flow divider and combiner dividing hydraulic flow and pressure between the at least one left hydraulic circuit and the at least one right hydraulic circuit. The at least one hydraulic flow divider and combiner functions to coordinate the motion of the left rear lift wheels and the right rear lift wheels.

The invention in another form is directed to a hydraulic system for an agricultural tillage implement. The agricultural tillage implement has a main frame section, a left wing section and a right wing section coupled with the main frame section. The agricultural tillage implement further has at least one first left rear lift wheel connected to either the main frame section or the left wing section. The agricultural tillage implement further has at least one additional left rear lift wheel connected to the left wing section. The agricultural tillage implement further has at least one first right rear lift wheel connected to either the main frame section or the right wing section. The agricultural tillage implement further has at least one additional right rear lift wheel connected to the right wing section.

The agricultural tillage implement has at least one main implement connected to the main frame section, at least one left wing implement connected to the left wing section, and at least one right wing implement connected to the right wing section. At least one first left front gauge wheel is connected to either the at least one main implement or the at least one left wing implement. At least one additional left front gauge wheel is connected to the at least one left wing implement. At least one first right front gauge wheel is connected to either the at least one main implement or the at least one right wing implement. At least one additional right front gauge wheel is connected to the at least one right wing implement.

A first left rear lift wheel hydraulic cylinder actuates the at least one first left rear lift wheel. An additional left rear lift wheel hydraulic cylinder actuates each of the at least one additional left rear lift wheels. A first right rear lift wheel hydraulic cylinder actuates the at least one first right rear lift wheel. An additional right rear lift wheel hydraulic cylinder actuates each of the at least one additional right rear lift wheels. At least one left hydraulic circuit supplies hydraulic pressure and flow to at least one left wing hydraulic subsystem for actuating the first left rear lift wheel hydraulic cylinder and the at least one additional left rear lift wheel hydraulic cylinder. At least one right hydraulic circuit supplies hydraulic pressure and flow to at least one right wing hydraulic subsystem for actuating the first right rear lift wheel hydraulic cylinder and the at least one additional right rear lift wheel hydraulic cylinder.

The at least one left wing hydraulic subsystem has a first left wing rear three way solenoid valve hydraulically connecting the first left rear lift wheel hydraulic cylinder to the at least one left hydraulic circuit. The at least one left wing hydraulic subsystem further has an additional left wing rear three way solenoid valve hydraulically connecting each additional left rear lift wheel hydraulic cylinder to the previous left rear lift wheel hydraulic cylinder. The at least one left wing hydraulic subsystem further has a left wing rear bypass circuit hydraulically interconnecting each left wing rear three way solenoid valve.

The at least one right wing hydraulic subsystem has a first right wing rear three way solenoid valve hydraulically connecting the first right rear lift wheel hydraulic cylinder to the at least one right hydraulic circuit. The at least one right wing hydraulic subsystem further has an additional right wing rear three way solenoid valve hydraulically connecting each additional right rear lift wheel hydraulic cylinder to the previous right rear lift wheel hydraulic cylinder. The at least one right wing hydraulic subsystem further has a right wing rear bypass circuit hydraulically interconnecting each right wing rear three way solenoid valve.

The three way solenoid valves and the bypass circuits function to selectively allow coordinated control and individual control of the lift wheels. The hydraulic system has at least one hydraulic flow divider and combiner dividing hydraulic flow and pressure between the at least one left hydraulic circuit and the at least one right hydraulic circuit. The at least one hydraulic flow divider and combiner functions to coordinate the motion of the left rear lift wheel hydraulic cylinders and the right rear lift wheel hydraulic cylinders.

An advantage of the present invention is that it maintains uniform and level tool contact with the soil while coordinating the raising and lowering of the tillage implement and its wing sections. A uniform physical depth of tillage is accomplished, along with uniform entry of the disk blades or harrows into the soil. The present invention is applicable to multiple types of agricultural implements. The present invention is further compatible with various arrangements of lift wheels and gauge wheels.

Another advantage of the present invention is that, while it is operable to coordinate the raising and lowering of the tillage implement, individual adjustments may be made to the hydraulic cylinders that actuate the lift wheels and gauge wheels. This allows the system to compensate for hydraulic leakage, wheel loading, or other variables.

Another advantage of the present invention is that coordination of the raising and lowering of the tillage implement sections is accomplished using off the shelf hydraulic components, without requiring extensive sophisticated electro-hydraulics. The valves and hydraulic cylinders are easily calibrated, without requiring extensive adjustment or operator intervention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
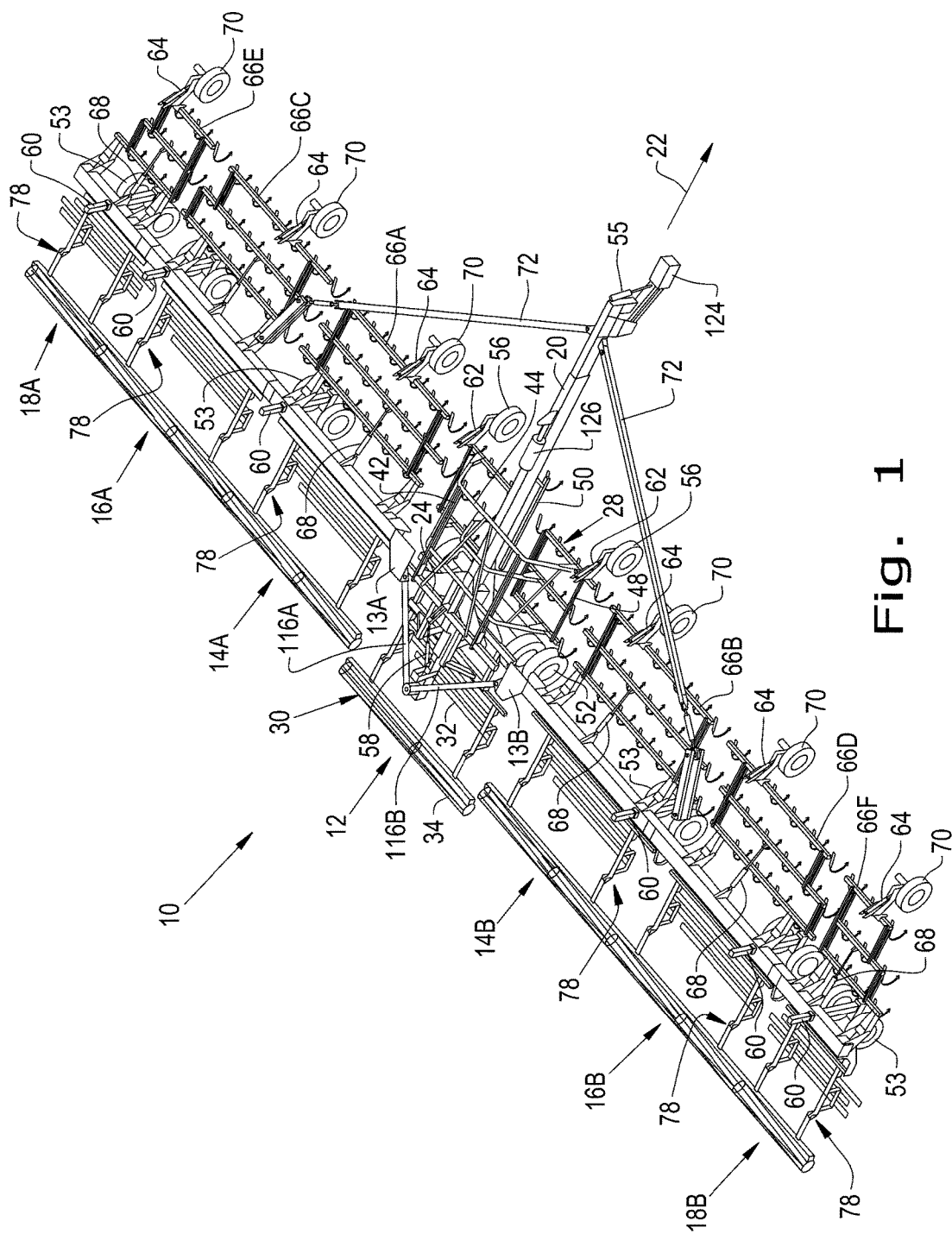
FIG. 1 is a top perspective view of an embodiment of an agricultural tillage implement of the present invention, in the form of a field cultivator.
Figure 2:
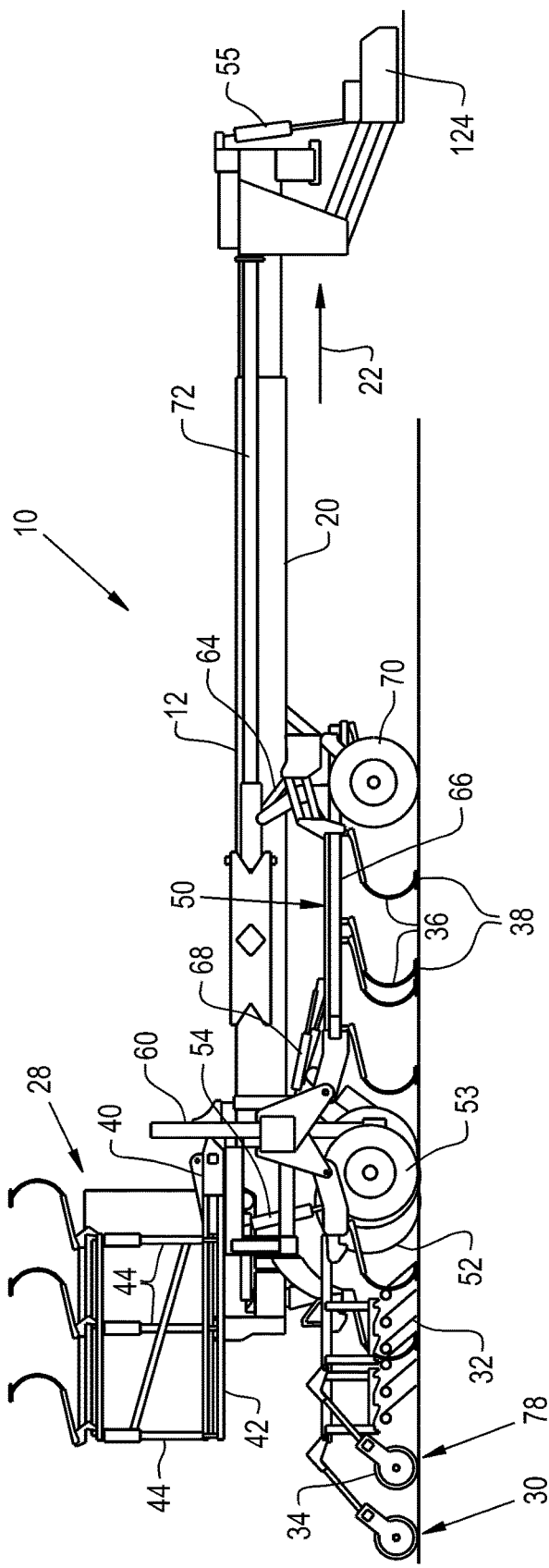
FIG. 2 is a side view of an embodiment of an agricultural tillage implement of the present invention, with the main shank frame folded to a transport configuration.

Referring now to the drawings, and more particularly to FIGS. 1 and 2, there is shown an embodiment of an agricultural tillage implement of the present invention. In the illustrated embodiment, the agricultural tillage implement 10 is in the form of a field cultivator for tilling and finishing soil prior to seeding.

Agricultural tillage implement 10 is configured as a multi-section field cultivator, and includes a main frame section 12 and a plurality of wing sections 14A, 14B, 16A, 16B, 18A, and 18B. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections. Intermediate wings 13A and 13B may be attached to main frame section 12, and may provide generally vertical axes (not shown) about which the plurality of wing sections 14A, 14B, 16A, 16B, 18A, and 18B pivot.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20. Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as a spike tooth drag, cultivator shanks, etc.

Main shank frame 28 generally functions to carry cultivator shanks 36 with shovels 38 at their lower ends for tilling the soil. Main shank frame 28 is pivotally coupled with tool bar 24, preferably at the top of tool bar 24, such as with couplings 40. Main shank frame 28 is positioned in front of the tool bar 24 when in an operating configuration (FIG. 1), and is foldable up and over the tool bar 24 to a position rearward of tool bar 24 when in a transport configuration (FIG. 2). Main shank frame 28 includes two sets of longitudinal frame members 42 which are pivotally coupled with tool bar 24 at one end. A plurality of cross frame members 44 are coupled with the longitudinal frame members 42. Each of the cross frame members 44 extend horizontally past longitudinal frame members 42, then in a downwardly angled direction, whereby their outboard ends are positioned on opposite lateral sides of the pull hitch tube 20 when in an operating configuration. The outboard ends of the cross frame members 44 are coupled with a pair of respective main shank sub-frames 48. Main shank sub-frames 48 are spaced apart from each other in a direction transverse to pull hitch tube 20 and are positioned on respective opposite lateral sides of pull hitch tube 20 when in an operating configuration.

A center shank sub-frame 50 is attached to and positioned below pull hitch tube 20. Since main shank sub-frames 48 are spaced apart on either side of pull hitch tube 20, center shank sub-frame 50 functions to till the soil in the intermediate open space between the two main shank sub-frames 48. Center shank sub-frame 50 includes a number of cultivator shanks 36 and corresponding shovels 38; three in the illustrated embodiment. Center shank sub-frame 50 may be raised up and down with the raising and lowering of the main frame section 12 using rear lift wheels 52 using hydraulic cylinder or cylinders 54 and using hydraulic cylinder 55 connected to pull hitch 124. Alternately, center shank sub-frame 50 may be raised or lowered independently of main frame section 12.

Main shank frame 28 also includes one or more gauge wheel assemblies 56 which function to level main shank sub-frames 48 using hydraulic cylinders 62, and to control the depth of the cultivator shanks 36. In the illustrated embodiment, main shank frame 28 includes two gauge wheel assemblies 56 which are respectively coupled with a front of a respective main shank sub-frame 48. A hydraulic cylinder 58 is used to fold main shank frame 28 from the operating configuration to the transport configuration, and vice versa. Hydraulic cylinder 58 may optionally be placed in a "float mode" such that gauge wheel assemblies 56 are operable to float up and down as they traverse across a field and thereby cooperate with hydraulic cylinders 62 actuating gauge wheel assemblies 56 to set the operating depth at the front edge of main shank frame 28.

Similarly, wing sections 14A, 14B, 16A, 16B, 18A, and 18B are provided with left inner wing front shank frame 66A, right inner wing front shank frame 66B, left middle wing front shank frame 66C, right middle wing front shank frame 66D, left outer wing front shank frame 66E, and right outer wing front shank frame 66F, respectively, which each function to carry cultivator shanks 36 with shovels 38 at their lower ends for tilling the soil. Each of the left inner wing front shank frame 66A, right inner wing front shank frame 66B, left middle wing front shank frame 66C, right middle wing front shank frame 66D, left outer wing front shank frame 66E, and right outer wing front shank frame 66F is provided with at least one gauge wheel assembly 70 which function to level the wing front shank frames 66A, 66B, 66C, 66D, 66E, and 66F using hydraulic cylinders 64, and to control the depth of the cultivator shanks. Hydraulic cylinders 68, which serve to fold the wing front shank frames 66A, 66B, 66C, 66D, 66E, and 66F upwards as will be described, may optionally be placed in a "float mode" such that the gauge wheel assemblies 70 are operable to float up and down as they traverse across a field and thereby cooperate with hydraulic cylinders 64 actuating gauge wheel assemblies 70 to set the operating depth at the front edges of wing front shank frames 66A, 66B, 66C, 66D, 66E, and 66F.

Left and right wing sections 14A, 14B, 16A, 16B, 18A, and 18B are braced by diagonally angled draft tubes 72. Main fold hydraulic cylinders 116A and 116B are shown in a rear mounted configuration, so that for example right main fold hydraulic cylinder 116B acts on intermediate wing 13B of wing sections 14B, 16B, and 18B directly. It is also contemplated that main fold hydraulic cylinder may be mounted longitudinally on telescoping pull hitch tube 20, causing extending telescoping pull hitch tube 20 to pull wing sections 14B, 16B, and 18B into the transport configuration by action of the diagonally angled draft tubes 72 when the wing sections 14A, 14B, 16A, 16B, 18A, and 18B are folded forward.

During use, it is periodically necessary to move the agricultural tillage implement 10 from an unfolded (operating) configuration to a folded (transport) configuration. Hydraulic cylinder 54 may first be actuated to lift the main frame section 12 to the raised transport configuration using rear lift wheels 52 in cooperation with hydraulic cylinder 55 connected to pull hitch 124. Center shank sub-frame 50 may then be independently moved to a raised position if agricultural tillage implement 10 is provided with an independently movable center shank sub-frame 50. Hydraulic cylinders 60 then actuate toolbar lift wheels 53 to lift wing sections 14A, 14B, 16A, 16B, 18A, and 18B to the raised transport position along with main frame section 12, which toolbar lift wheels 53 are then allowed to caster or pivot.

Hydraulic cylinder 58 is then retracted to fold main shank frame 28 up and over tool bar 24 to an inverted position above and rearward of tool bar 24 (FIG. 2). Crumbler basket 34 of main rear auxiliary implement 30 may then also be moved to a raised position. Then the wing front shank frames 66A, 66B, 66C, 66D, 66E, and 66F of the wing sections 14A, 14B, 16A, 16B, 18A, and 18B are folded upwards to a position at or near vertical by retracting hydraulic cylinders 68. Gauge wheel assemblies 56 and 70 may also be retracted at this point using hydraulic cylinders 62 and 64, respectively. Wing front shank frames 66A, 66B, 66C, 66D, 66E, and 66F of the wing sections 14A, 14B, 16A, 16B, 18A, and 18B may be folded upwards to the generally vertical position at the same time, or may be folded upwards to the generally vertical position sequentially.

Wing section rear auxiliary implements 78, which may include spring tooth drags, crumbler baskets, spike tooth drags, cultivator shanks, or any combination thereof, may then also be folded upwards to a position at or near vertical. Wing section rear auxiliary implements 78 may also be folded upwards to a generally vertical position at the same time, or may be folded upwards to the generally vertical position sequentially. Further, crumbler basket 34 of main rear auxiliary implement 30 may be moved to its raised position at the same time that wing section rear auxiliary implements 78 are folded upwards to their generally vertical positions.

A telescoping hitch lock cylinder 126 is then retracted, releasing pull hitch tube 20 to telescope. Wing sections 14A, 14B, 16A, 16B, 18A, and 18B are then folded forward by left main fold hydraulic cylinder 116A and right main fold hydraulic cylinder 116B about generally vertical axes which pass through intermediate wings 13A and 13B to a position adjacent to and generally parallel with pull hitch tube 20. Gauge wheel assemblies 56 at the front of main shank frame 28 and gauge wheel assemblies 70 at the front of wing sections 14A, 14B, 16A, 16B, 18A, and 18B are all configured as caster wheels and are not in contact with the ground when agricultural tillage implement 10 is in the folded or transport configuration. For unfolding the agricultural tillage implement 10 to the operating configuration, the reverse folding sequence is carried out.

The folding sequence of steps to reconfigure the agricultural tillage implement from an operating configuration to a transport configuration may therefore include pivoting the main shank frame 28 up and over the tool bar 24 by retracting hydraulic cylinder 58, pivoting the wing front shank frames 66A, 66B, 66C, 66D, 66E, and 66F to a generally vertical position by retracting hydraulic cylinders 68 and locking the wing front shank frames 66A, 66B, 66C, 66D, 66E, and 66F in the generally vertical position, retracting gauge wheel assemblies 56 and 70 using hydraulic cylinders 62 and 64, retracting a telescoping hitch lock cylinder 126, and pivoting the wing sections 14A, 14B, 16A, 16B, 18A, and 18B about generally vertical axes to a position adjacent to and generally parallel with the pull hitch tube 20 using main fold hydraulic cylinders 116.

The folding sequence of steps to reconfigure the agricultural tillage implement from an operating configuration to a transport configuration may alternately include raising the main frame section 12 using hydraulic cylinder 54 connected to rear lift wheels 52 and using hydraulic cylinder 55 connected to pull hitch 124 while using hydraulic cylinders 60 to actuate the toolbar lift wheels 53 to raise the wing sections 14A, 14B, 16A, 16B, 18A, and 18B, raising the center shank sub-frame 50, pivoting the main shank frame 28 up and over the tool bar 24 by retracting hydraulic cylinder 58, raising the crumbler basket 34 of the main rear auxiliary implement 30, pivoting the wing front shank frames 66A, 66B, 66C, 66D, 66E, and 66F to a generally vertical position by retracting hydraulic cylinders 68 and locking the wing front shank frames 66A, 66B, 66C, 66D, 66E, and 66F in the generally vertical position, retracting gauge wheel assemblies 56 and 70 using hydraulic cylinders 62 and 64, pivoting the wing section rear auxiliary implements 78 to a generally vertical position and locking the wing section rear auxiliary implements 78 in the generally vertical position, retracting a telescoping hitch lock cylinder 126, and pivoting the wing sections 14A, 14B, 16A, 16B, 18A, and 18B about generally vertical axes to a position adjacent to and generally parallel with the pull hitch tube 20 using main fold hydraulic cylinders 116. The folding sequence of steps to reconfigure the agricultural tillage implement from an operating configuration to a transport configuration may further include pivoting the wing front shank frames 66A, 66B, 66C, 66D, 66E, and 66F to a generally vertical position in a sequential manner.

The unfolding sequence of steps to reconfigure the agricultural tillage implement from a transport configuration to an operating configuration may therefore include pivoting the wing sections 14A, 14B, 16A, 16B, 18A, and 18B outward about generally vertical axes to a position perpendicular to the pull hitch tube 20 using main fold hydraulic cylinders 116, extending a telescoping hitch lock hydraulic cylinder 126, unlocking and pivoting the wing front shank frames 66A, 66B, 66C, 66D, 66E, and 66F to a generally horizontal position by extending hydraulic cylinders 68, pivoting the main shank frame 28 down and forward of the tool bar 24 by extending hydraulic cylinder 58, and extending gauge wheel assemblies 56 and 70 using hydraulic cylinders 62 and 64.

The unfolding sequence of steps to reconfigure the agricultural tillage implement from a transport configuration to an operating configuration may alternately include pivoting the wing sections 14A, 14B, 16A, 16B, 18A, and 18B outward about generally vertical axes to a position perpendicular to the pull hitch tube 20 using main fold hydraulic cylinders 116, extending a telescoping hitch lock hydraulic cylinder 126, unlocking and pivoting the wing front shank frames 66A, 66B, 66C, 66D, 66E, and 66F to a generally horizontal position by extending hydraulic cylinders 68, unlocking and pivoting the wing section rear auxiliary implements 78 to a generally horizontal position, pivoting the main shank frame 28 down and forward of the tool bar 24 by extending hydraulic cylinder 58, extending gauge wheel assemblies 56 and 70 using hydraulic cylinders 62 and 64, lowering the crumbler basket 34 of the main rear auxiliary implement 30, lowering the center shank sub-frame 50, and lowering the main frame section 12 using hydraulic cylinder 54 connected to rear lift wheels 52 and using hydraulic cylinder 55 connected to pull hitch 124 while using hydraulic cylinders 60 to actuate the toolbar lift wheels 53 to lower the wing sections 14A, 14B, 16A, 16B, 18A, and 18B. The unfolding sequence of steps to reconfigure the agricultural tillage implement from a transport configuration to an operating configuration may further include pivoting the wing front shank frames 66A, 66B, 66C, 66D, 66E, and 66F to a generally horizontal position in a sequential manner.

Figure 3:
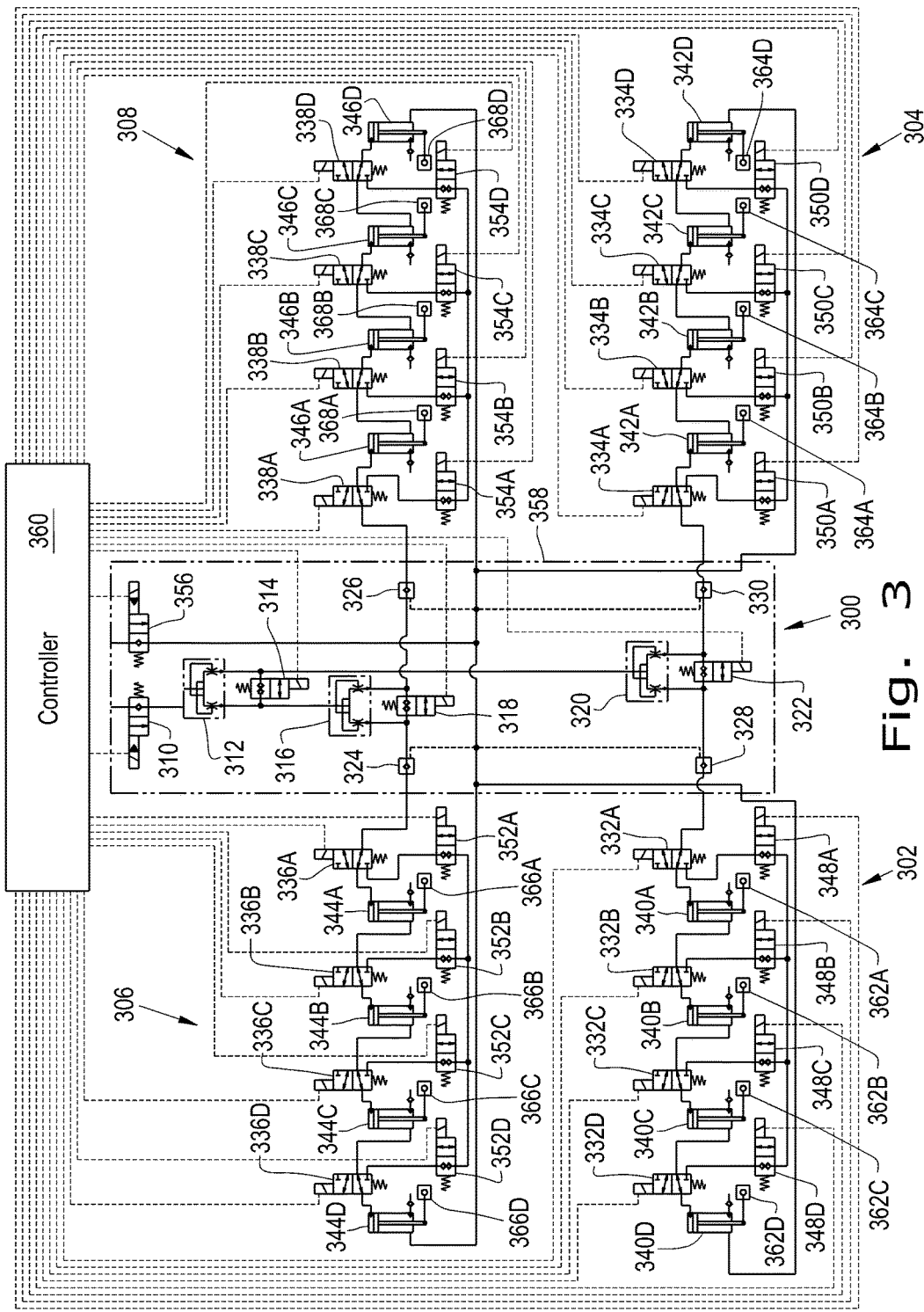
FIG. 3 is a schematic illustration of a tillage implement hydraulic system according to an embodiment of the present invention.

Turning now to FIG. 3, a schematic illustration of a tillage implement hydraulic system 300 according to one embodiment of the present invention is shown. The tillage implement hydraulic system 300 includes a right wing front gauge wheel hydraulic subsystem 302, a left wing front gauge wheel hydraulic subsystem 304, a right wing rear lift wheel hydraulic subsystem 306, and a left wing rear lift wheel hydraulic subsystem 308. Hydraulic pressure and flow is selectively admitted to the tillage implement hydraulic system 300 by a first solenoid operated normally closed directional control check valve with manual override 310, whereupon the hydraulic pressure and flow proceeds to a first hydraulic flow divider and combiner 312, which splits the hydraulic flow between the rear lift wheel hydraulic subsystems 306, 308, and the front gauge wheel hydraulic subsystems 302, 304, respectively. The first hydraulic flow divider and combiner 312 may split the hydraulic flow between the rear lift wheel hydraulic subsystems 306, 308, and the front gauge wheel hydraulic subsystems 302, 304, in a 60/40 ratio, as a non-limiting example. A first solenoid operated normally closed two way poppet bypass valve 314 interconnects the hydraulic flow proceeding to the rear lift wheel hydraulic subsystems 306, 308, and to the front gauge wheel hydraulic subsystems 302, 304, subsequent to its division by the first hydraulic flow divider and combiner 312, which first solenoid operated normally closed two way poppet bypass valve 314 may selectively rejoin the flow proceeding from the first hydraulic flow divider and combiner 312 for use in one or the other of the rear lift wheel hydraulic subsystems 306, 308, or the front gauge wheel hydraulic subsystems 302, 304, according to need. In this way, actuation of hydraulic cylinders within the rear lift wheel hydraulic subsystems 306, 308, and within the front gauge wheel hydraulic subsystems 302, 304 may be accomplished in coordinated fashion by use of the first hydraulic flow divider and combiner 312, or may be accomplished selectively by rejoining the flow proceeding from the first hydraulic flow divider and combiner 312 using the first solenoid operated normally closed two way poppet bypass valve 314.

The hydraulic flow proceeding to the rear lift wheel hydraulic subsystems 306, 308, is then further split in a second hydraulic flow divider and combiner 316 between the right wing rear lift wheel hydraulic subsystem 306 and the left wing rear lift wheel hydraulic subsystem 308. A second solenoid operated normally closed two way poppet bypass valve 318 interconnects the hydraulic flow proceeding to the right wing rear lift wheel hydraulic subsystem 306 and to the left wing rear lift wheel hydraulic subsystem 308, subsequent to its division by the second hydraulic flow divider and combiner 316, which second solenoid operated normally closed two way poppet bypass valve 318 may selectively rejoin the flow proceeding from the second hydraulic flow divider and combiner 316 for use in one or the other of the right wing rear lift wheel hydraulic subsystem 306 or the left wing rear lift wheel hydraulic subsystem 308, according to need. In this way, actuation of hydraulic cylinders within the right wing rear lift wheel hydraulic subsystem 306 and within the left wing rear lift wheel hydraulic subsystem 308 may be accomplished in coordinated fashion by use of the second hydraulic flow divider and combiner 316, or may be accomplished selectively by rejoining the flow proceeding from the second hydraulic flow divider and combiner 316 using the second solenoid operated normally closed two way poppet bypass valve 318.

The hydraulic flow proceeding to the front gauge wheel hydraulic subsystems 302, 304, is then further split in a third hydraulic flow divider and combiner 320 between the right wing front gauge wheel hydraulic subsystem 302 and the left wing front gauge wheel hydraulic subsystem 304. A third solenoid operated normally closed two way poppet bypass valve 322 interconnects the hydraulic flow proceeding to the right wing front gauge wheel hydraulic subsystem 302 and the left wing front gauge wheel hydraulic subsystem 304, subsequent to its division by the third hydraulic flow divider and combiner 320, which third solenoid operated normally closed two way poppet bypass valve 322 may selectively rejoin the flow proceeding from the third hydraulic flow divider and combiner 320 for use in one or the other of the right wing front gauge wheel hydraulic subsystem 302 or the left wing front gauge wheel hydraulic subsystem 304, according to need. In this way, actuation of hydraulic cylinders within the right wing front gauge wheel hydraulic subsystem 302 and within the right wing front gauge wheel hydraulic subsystem 304 may be accomplished in coordinated fashion by use of the third hydraulic flow divider and combiner 320, or may be accomplished selectively by rejoining the flow proceeding from the third hydraulic flow divider and combiner 320 using the third solenoid operated normally closed two way poppet bypass valve 322.

Hydraulic flow and pressure proceeding from the second hydraulic flow divider and combiner 316 and/or the second solenoid operated normally closed two way poppet bypass valve 318 then passes through a first pilot operated check valve 324 or a second pilot operated check valve 326 before proceeding to the right wing rear lift wheel hydraulic subsystem 306 or to the left wing rear lift wheel hydraulic subsystem 308, respectively. Hydraulic flow and pressure proceeding from the third hydraulic flow divider and combiner 320 and/or the third solenoid operated normally closed two way poppet bypass valve 322 then passes through a third pilot operated check valve 328 or a fourth pilot operated check valve 330 before proceeding to the right wing front gauge wheel hydraulic subsystem 302 or the left wing front gauge wheel hydraulic subsystem 304, respectively.

Each of the first solenoid operated normally closed directional control check valve with manual override 310, the first hydraulic flow divider and combiner 312, the first solenoid operated normally closed two way poppet bypass valve 314, the second hydraulic flow divider and combiner 316, the second solenoid operated normally closed two way poppet bypass valve 318, the third hydraulic flow divider and combiner 320, the third solenoid operated normally closed two way poppet bypass valve 322, the first pilot operated check valve 324, the second pilot operated check valve 326, the third pilot operated check valve 328, and the fourth pilot operated check valve 330 may be contained within a manifold 358.

The right wing front gauge wheel hydraulic subsystem 302 has at least one right wing front gauge wheel hydraulic cylinder 340, four being illustrated in the embodiment of the invention shown in FIG. 3, as a non-limiting example, each of which is selectively supplied with hydraulic flow and pressure using a right wing front gauge wheel hydraulic cylinder three way solenoid valve 332. Right wing front gauge wheel hydraulic cylinder 340A may correspond to hydraulic cylinder 62 actuating the gauge wheel assembly 56 on the forward right corner of the main shank frame 28 shown in FIG. 1. Right wing front gauge wheel hydraulic cylinders 340B, 340C, and 340D may correspond to hydraulic cylinders 64 actuating the gauge wheel assemblies 70 on right inner wing front shank frame 66B, right middle wing front shank frame 66D, and right outer wing front shank frame 66F, respectively, shown in FIG. 1. Alternately, each of the right wing front gauge wheel hydraulic cylinders 340A, 340B, 340C, and 340D may correspond to hydraulic cylinders 64 actuating gauge wheel assemblies 70 on right wing shank frames. Right wing front gauge wheel hydraulic cylinders 340A, 340B, 340C, and 340D are used to control the depth of the cultivator shanks 36 on the main shank frame 28, right inner wing front shank frame 66B, right middle wing front shank frame 66D, and right outer wing front shank frame 66F.

The first right wing front gauge wheel hydraulic cylinder three way solenoid valve 332A shown in FIG. 3 is configured to normally apply hydraulic flow and pressure received from the third pilot operated check valve 328 to the right wing front gauge wheel hydraulic cylinder 340A, and upon energization to divert the hydraulic flow and pressure to a right wing front gauge wheel bypass valve 348A. Each of the subsequent right wing front gauge wheel hydraulic cylinder three way solenoid valves 332B, 332C, 332D is configured to normally apply hydraulic flow and pressure received from the previous right wing front gauge wheel hydraulic cylinders 340A, 340B, 340C, respectively, to its own right wing front gauge wheel hydraulic cylinder 340B, 340C, 340D, respectively. Upon energization, each of the subsequent right wing front gauge wheel hydraulic cylinder three way solenoid valves 332B, 332C, 332D is configured to apply hydraulic flow and pressure received from right wing front gauge wheel bypass valve 348A via respective right wing front gauge wheel bypass valve 348B, 348C, 348D, respectively, to its own right wing front gauge wheel hydraulic cylinder 340B, 340C, 340D, respectively.

In this way, the actuation of the right wing front gauge wheel hydraulic cylinders 340A, 340B, 340C, and 340D may be coordinated by leaving the right wing front gauge wheel hydraulic cylinder three way solenoid valves 332A, 332B, 332C, and 332D de-energized so that displacement of each of right wing front gauge wheel hydraulic cylinders 340A, 340B, and 340C forces hydraulic fluid into each of subsequent right wing front gauge wheel hydraulic cylinders 340B, 340C, and 340D, respectively, resulting in coordinated motion. When it is desired to bypass adjustment of right wing front gauge wheel hydraulic cylinder 340A, right wing front gauge wheel hydraulic cylinder three way solenoid valves 332A and 332B are energized, along with right wing front gauge wheel bypass valves 348A and 348B, thereby bypassing right wing front gauge wheel hydraulic cylinder 340A and actuating remaining right wing front gauge wheel hydraulic cylinders 340B, 340C, and 340D. Similarly, if it is desired to bypass adjustment of right wing front gauge wheel hydraulic cylinders 340A and 340B, right wing front gauge wheel hydraulic cylinder three way solenoid valves 332A and 332C are energized, along with right wing front gauge wheel bypass valves 348A and 348C, thereby bypassing right wing front gauge wheel hydraulic cylinders 340A and 340B and actuating remaining right wing front gauge wheel hydraulic cylinders 340C and 340D. Similarly, if it is desired to bypass adjustment of right wing front gauge wheel hydraulic cylinders 340A, 340B, and 340C, right wing front gauge wheel hydraulic cylinder three way solenoid valves 332A and 332D are energized, along with right wing front gauge wheel bypass valves 348A and 348D, thereby bypassing right wing front gauge wheel hydraulic cylinders 340A, 340B, and 340C, and actuating remaining right wing front gauge wheel hydraulic cylinder 340D. Additionally, the right wing front gauge wheel bypass valves 348A, 348B, 348C, and 348D may assist in limiting leakage from right wing front gauge wheel hydraulic cylinder three way solenoid valves 332A, 332B, 332C, and 332D.

Similarly, the left wing front gauge wheel hydraulic subsystem 304 has at least one left wing front gauge wheel hydraulic cylinder 342, four being illustrated in the embodiment of the invention shown in FIG. 3, as a non-limiting example, each of which is selectively supplied with hydraulic flow and pressure using a left wing front gauge wheel hydraulic cylinder three way solenoid valve 334. Left wing front gauge wheel hydraulic cylinder 342A may correspond to hydraulic cylinder 62 actuating the gauge wheel assembly 56 on the forward left corner of the main shank frame 28 shown in FIG. 1. Left wing front gauge wheel hydraulic cylinders 342B, 342C, and 342D may correspond to hydraulic cylinders 64 actuating the gauge wheel assemblies 70 on left inner wing front shank frame 66A, left middle wing front shank frame 66C, and left outer wing front shank frame 66E, respectively, shown in FIG. 1. Alternately, each of the left wing front gauge wheel hydraulic cylinders 342A, 342B, 342C, and 342D may correspond to hydraulic cylinders 64 actuating gauge wheel assemblies 70 on left wing shank frames. Left wing front gauge wheel hydraulic cylinders 342A, 342B, 342C, and 342D are used to control the depth of the cultivator shanks 36 on the main shank frame 28, right inner wing front shank frame 66B, right middle wing front shank frame 66D, and right outer wing front shank frame 66F.

The first left wing front gauge wheel hydraulic cylinder three way solenoid valve 334A shown in FIG. 3 is configured to normally apply hydraulic flow and pressure received from the fourth pilot operated check valve 330 to the left wing front gauge wheel hydraulic cylinder 342A, and upon energization to divert the hydraulic flow and pressure to a left wing front gauge wheel bypass valve 350A. Each of the subsequent left wing front gauge wheel hydraulic cylinder three way solenoid valves 334B, 334C, 334D is configured to normally apply hydraulic flow and pressure received from the previous left wing front gauge wheel hydraulic cylinders 342A, 342B, 342C, respectively, to its own left wing front gauge wheel hydraulic cylinder 342B, 342C, 342D, respectively. Upon energization, each of the subsequent left wing front gauge wheel hydraulic cylinder three way solenoid valves 334B, 334C, 334D is configured to apply hydraulic flow and pressure received from left wing front gauge wheel bypass valve 350A via respective left wing front gauge wheel bypass valve 350B, 350C, 350D, respectively, to its own left wing front gauge wheel hydraulic cylinder 342B, 342C, 342D, respectively.

In this way, the actuation of the left wing front gauge wheel hydraulic cylinders 342A, 342B, 342C, and 342D may be coordinated by leaving the left wing front gauge wheel hydraulic cylinder three way solenoid valves 334A, 334B, 334C, and 334D de-energized so that displacement of each of left wing front gauge wheel hydraulic cylinders 342A, 342B, and 342C forces hydraulic fluid into each of subsequent left wing front gauge wheel hydraulic cylinders 342B, 342C, and 342D, respectively, resulting in coordinated motion. When it is desired to bypass adjustment of left wing front gauge wheel hydraulic cylinder 342A, left wing front gauge wheel hydraulic cylinder three way solenoid valves 334A and 334B are energized, along with left wing front gauge wheel bypass valves 350A and 350B, thereby bypassing left wing front gauge wheel hydraulic cylinder 342A and actuating remaining left wing front gauge wheel hydraulic cylinders 342B, 342C, and 342D. Similarly, if it is desired to bypass adjustment of left wing front gauge wheel hydraulic cylinders 342A and 342B, left wing front gauge wheel hydraulic cylinder three way solenoid valves 334A and 334C are energized, along with left wing front gauge wheel bypass valves 350A and 350C, thereby bypassing left wing front gauge wheel hydraulic cylinders 342A and 342B and actuating remaining left wing front gauge wheel hydraulic cylinders 342C and 342D. Similarly, if it is desired to bypass adjustment of left wing front gauge wheel hydraulic cylinders 342A, 342B, and 342C, left wing front gauge wheel hydraulic cylinder three way solenoid valves 334A and 334D are energized, along with left wing front gauge wheel bypass valves 350A and 350D, thereby bypassing left wing front gauge wheel hydraulic cylinders 342A, 342B, and 342C, and actuating remaining left wing front gauge wheel hydraulic cylinder 342D. Additionally, the left wing front gauge wheel bypass valves 350A, 350B, 350C, and 350D may assist in limiting leakage from left wing front gauge wheel hydraulic cylinder three way solenoid valves 334A, 334B, 334C, and 334D.

Similarly, the right wing rear lift wheel hydraulic subsystem 306 has at least one right wing rear lift wheel hydraulic cylinder 344, four being illustrated in the embodiment of the invention shown in FIG. 3, as a non-limiting example, each of which is selectively supplied with hydraulic flow and pressure using a right wing rear lift wheel hydraulic cylinder three way solenoid valve 336. Right wing rear lift wheel hydraulic cylinder 344A may correspond to a right hand hydraulic cylinder 54 actuating the rear lift wheels 52 on an embodiment wherein there are at least two such hydraulic cylinders 54 actuating the rear lift wheels 52 independently. Right wing rear lift wheel hydraulic cylinders 344B, 344C, and 344D may correspond to hydraulic cylinders 60 actuating wing lift wheels 53 on right inner wing section 14B, right middle wing section 16B, and right outer wing section 18B, respectively, shown in FIG. 1. Alternately, each of the right wing rear lift wheel hydraulic cylinders 344A, 344B, 344C, and 344D may correspond to hydraulic cylinders 60 actuating lift wheels 53 on right wing sections 14B, 16B, 18B. Right wing rear lift wheel hydraulic cylinders 344A, 344B, 344C, and 344D are used to control the depth of the cultivator shanks 36 and spring tooth drags 32 attached to the rear auxiliary implements 30 and 78.

The first right wing rear lift wheel hydraulic cylinder three way solenoid valve 336A shown in FIG. 3 is configured to normally apply hydraulic flow and pressure received from the first pilot operated check valve 324 to the right wing rear lift wheel hydraulic cylinder 344A, and upon energization to divert the hydraulic flow and pressure to a right wing rear lift wheel bypass valve 352A. Each of the subsequent right wing rear lift wheel hydraulic cylinder three way solenoid valves 336B, 336C, 336D is configured to normally apply hydraulic flow and pressure received from the previous right wing rear lift wheel hydraulic cylinders 344A, 344B, 344C, respectively, to its own right wing rear lift wheel hydraulic cylinders 344B, 344C, 344D, respectively. Upon energization, each of the subsequent right wing rear lift wheel hydraulic cylinder three way solenoid valves 336B, 336C, 336D is configured to apply hydraulic flow and pressure received from right wing rear lift wheel bypass valve 352A via respective right wing rear lift wheel bypass valve 352B, 352C, 352D, respectively, to its own right wing rear lift wheel hydraulic cylinders 344B, 344C, 344D, respectively.

In this way, the actuation of the right wing rear lift wheel hydraulic cylinders 344A, 344B, 344C, and 344D may be coordinated by leaving the right wing rear lift wheel hydraulic cylinder three way solenoid valves 336A, 336B, 336C, and 336D de-energized so that displacement of each of right wing rear lift wheel hydraulic cylinders 344A, 344B, and 344C forces hydraulic fluid into each of subsequent right wing rear lift wheel hydraulic cylinders 344B, 344C, and 344D, respectively, resulting in coordinated motion. When it is desired to bypass adjustment of right wing rear lift wheel hydraulic cylinder 344A, right wing rear lift wheel hydraulic cylinder three way solenoid valves 336A and 336B are energized, along with right wing rear lift wheel bypass valves 352A and 352B, thereby bypassing right wing rear lift wheel hydraulic cylinder 344A and actuating remaining right wing rear lift wheel hydraulic cylinders 344B, 344C, and 344D. Similarly if it is desired to bypass adjustment of right wing rear lift wheel hydraulic cylinders 344A and 344B, right wing rear lift wheel hydraulic cylinder three way solenoid valves 336A and 336C are energized, along with right wing rear lift wheel bypass valves 352A and 352C, thereby bypassing right wing rear lift wheel hydraulic cylinders 344A and 344B and actuating remaining right wing rear lift wheel hydraulic cylinders 344C and 344D. Similarly if it is desired to bypass adjustment of right wing rear lift wheel hydraulic cylinders 344A, 344B, and 344C, right wing rear lift wheel hydraulic cylinder three way solenoid valves 336A and 336D are energized, along with right wing rear lift wheel bypass valves 352A and 352D, thereby bypassing right wing rear lift wheel hydraulic cylinders 344A, 344B, and 344C, and actuating remaining right wing rear lift wheel hydraulic cylinder 344D. Additionally, the right wing rear lift wheel bypass valves 352A, 352B, 352C, and 352D may assist in limiting leakage from right wing rear lift wheel hydraulic cylinder three way solenoid valves 336A, 336B, 336C, and 336D.

Similarly, the left wing rear lift wheel hydraulic subsystem 308 has at least one left wing rear lift wheel hydraulic cylinder 346, four being illustrated in the embodiment of the invention shown in FIG. 3, as a non-limiting example, each of which is selectively supplied with hydraulic flow and pressure using a left wing rear lift wheel hydraulic cylinder three way solenoid valve 338. Left wing rear lift wheel hydraulic cylinder 346A may correspond to a left hand hydraulic cylinder 54 actuating the rear lift wheels 52 on an embodiment wherein there are at least two such hydraulic cylinders 54 actuating the rear lift wheels 52 independently. Left wing rear lift wheel hydraulic cylinders 346B, 346C, and 346D may correspond to hydraulic cylinders 60 actuating wing lift wheels 53 on left inner wing section 14A, left middle wing section 16A, and left outer wing section 18A, respectively, shown in FIG. 1. Alternately, each of the left wing rear lift wheel hydraulic cylinders 346A, 346B, 346C, and 346D may correspond to hydraulic cylinders 60 actuating lift wheels 53 on left wing sections 14A, 16A, 18A. Left wing rear lift wheel hydraulic cylinders 346A, 346B, 346C, and 346D are used to control the depth of the cultivator shanks 36 and spring tooth drags 32 attached to the rear auxiliary implements 30 and 78.

The first left wing rear lift wheel hydraulic cylinder three way solenoid valve 338A shown in FIG. 3 is configured to normally apply hydraulic flow and pressure received from the second pilot operated check valve 326 to the left wing rear lift wheel hydraulic cylinder 346A, and upon energization to divert the hydraulic flow and pressure to a left wing rear lift wheel bypass valve 354A. Each of the subsequent left wing rear lift wheel hydraulic cylinder three way solenoid valves 338B, 338C, 338D is configured to normally apply hydraulic flow and pressure received from the previous left wing rear lift wheel hydraulic cylinders 346A, 346B, 346C, respectively, to its own left wing rear lift wheel hydraulic cylinders 346B, 346C, 346D, respectively. Upon energization, each of the subsequent left wing rear lift wheel hydraulic cylinder three way solenoid valves 338B, 338C, 338D is configured to apply hydraulic flow and pressure received from left wing rear lift wheel bypass valve 354A via respective left wing rear lift wheel bypass valve 354B, 354C, 354D, respectively, to its own left wing rear lift wheel hydraulic cylinders 346B, 346C, 346D, respectively.

In this way, the actuation of the left wing rear lift wheel hydraulic cylinders 346A, 346B, 346C, and 346D may be coordinated by leaving the left wing rear lift wheel hydraulic cylinder three way solenoid valves 338A, 338B, 338C, and 338D de-energized so that displacement of each of left wing rear lift wheel hydraulic cylinders 346A, 346B, and 346C forces hydraulic fluid into each of subsequent left wing rear lift wheel hydraulic cylinders 346B, 346C, and 346D, respectively, resulting in coordinated motion. When it is desired to bypass adjustment of left wing rear lift wheel hydraulic cylinder 346A, left wing rear lift wheel hydraulic cylinder three way solenoid valves 338A and 338B are energized, along with left wing rear lift wheel bypass valves 354A and 354B, thereby bypassing left wing rear lift wheel hydraulic cylinder 346A and actuating remaining left wing rear lift wheel hydraulic cylinders 346B, 346C, and 346D. Similarly, if it is desired to bypass adjustment of left wing rear lift wheel hydraulic cylinders 346A and 346B, left wing rear lift wheel hydraulic cylinder three way solenoid valves 338A and 338C are energized, along with left wing rear lift wheel bypass valves 354A and 354C, thereby bypassing left wing rear lift wheel hydraulic cylinders 346A and 346B and actuating remaining left wing rear lift wheel hydraulic cylinders 346C and 346D. Similarly, if it is desired to bypass adjustment of left wing rear lift wheel hydraulic cylinders 346A, 346B, and 346C, left wing rear lift wheel hydraulic cylinder three way solenoid valves 338A and 338D are energized, along with left wing rear lift wheel bypass valves 354A and 354D, thereby bypassing left wing rear lift wheel hydraulic cylinders 346A, 346B, and 346C, and actuating remaining left wing rear lift wheel hydraulic cylinder 346D. Additionally, the left wing rear lift wheel bypass valves 354A, 354B, 354C, and 354D may assist in limiting leakage from left wing rear lift wheel hydraulic cylinder three way solenoid valves 338A, 338B, 338C, and 338D.

Note that for illustration purposes, all hydraulic cylinders shown in FIG. 3 are shown as acting in extension, although such hydraulic cylinders may instead act in retraction. Therefore, it is contemplated that any cylinder shown in the hydraulic diagram of FIG. 3 may be reversed in its direction of action, and still be within the scope of the present invention.

Subsequent to right wing front gauge wheel hydraulic cylinder 340D, left wing front gauge wheel hydraulic cylinder 342D, right wing rear lift wheel hydraulic cylinder 344D, and left wing rear lift wheel hydraulic cylinder 346D, the hydraulic flow returns from tillage implement hydraulic system 300 via a second solenoid operated normally closed directional control check valve with manual override 356, which may also be contained within the manifold 358.

Each of the first solenoid operated normally closed directional control check valve with manual override 310, the first solenoid operated normally closed two way poppet bypass valve 314, the second solenoid operated normally closed two way poppet bypass valve 318, the third solenoid operated normally closed two way poppet bypass valve 322, the right wing front gauge wheel hydraulic cylinder three way solenoid valves 332A, 332B, 332C, and 332D, the left wing front gauge hydraulic cylinder three way solenoid valves 334A, 334B, 334C, and 334D, the right wing rear lift wheel hydraulic cylinder three way solenoid valves 336A, 336B, 336C, and 336D, the left wing rear lift wheel hydraulic cylinder three way solenoid valves 338A, 338B, 338C, and 338D, the right wing front gauge wheel bypass valves 348A, 348B, 348C, and 348D, the left wing front gauge wheel bypass valves 350A, 350B, 350C, and 350D, the right wing rear lift wheel bypass valves 352A, 352B, 352C, and 352D, the left wing rear lift wheel bypass valves 354A, 354B, 354C, and 354D, and the second solenoid operated normally closed directional control check valve with manual override 356 are connected to a controller 360.

The controller 360 is operable to selectively coordinate the hydraulic cylinders of the right wing front gauge wheel hydraulic subsystem 302, the left wing front gauge wheel hydraulic subsystem 304, the right wing rear lift wheel hydraulic subsystem 306, and the left wing rear lift wheel hydraulic subsystem 308 using the first solenoid operated normally closed two way poppet bypass valve 314, the second solenoid operated normally closed two way poppet bypass valve 318, and the third solenoid operated normally closed two way poppet bypass valve 322, as described previously.

The controller 360 is further operable to selectively coordinate the right wing front gauge wheel hydraulic cylinders 340A, 340B, 340C, and 340D using the right wing front gauge wheel hydraulic cylinder three way solenoid valves 332A, 332B, 332C, and 332D, and the right wing front gauge wheel bypass valves 348A, 348B, 348C, and 348D, as described previously. The controller 360 is further operable to selectively coordinate the left wing front gauge wheel hydraulic cylinders 342A, 342B, 342C, and 342D using the left wing front gauge hydraulic cylinder three way solenoid valves 334A, 334B, 334C, and 334D, and the left wing front gauge wheel bypass valves 350A, 350B, 350C, and 350D, as described previously. The controller 360 is further operable to selectively coordinate the right wing rear lift wheel hydraulic cylinders 344A, 344B, 344C, and 344D using the right wing rear lift wheel hydraulic cylinder three way solenoid valves 336A, 336B, 336C, and 336D, and the right wing rear lift wheel bypass valves 352A, 352B, 352C, and 352D, as described previously. The controller 360 is further operable to selectively coordinate the left wing rear lift wheel hydraulic cylinders 346A, 346B, 346C, and 346D using the left wing rear lift wheel hydraulic cylinder three way solenoid valves 338A, 338B, 338C, and 338D, and the left wing rear lift wheel bypass valves 354A, 354B, 354C, and 354D, as described previously.

Each of the right wing front gauge wheel hydraulic cylinders 340A, 340B, 340C, and 340D is provided with a right wing front gauge wheel hydraulic cylinder displacement detecting device 362A, 362B, 362C, and 362D, respectively. The right wing front gauge wheel hydraulic cylinder displacement detecting devices 362A, 362B, 362C, and 362D are each connected to the controller 360 (connection not shown for simplicity), and provide signals proportional to the displacement of the right wing front gauge wheel hydraulic cylinders 340A, 340B, 340C, 340D. Each of the left wing front gauge wheel hydraulic cylinders 342A, 342B, 342C, and 342D is provided with a left wing front gauge wheel hydraulic cylinder displacement detecting device 364A, 364B, 364C, and 364D, respectively. The left wing front gauge wheel hydraulic cylinder displacement detecting devices 364A, 364B, 364C, and 364D are each connected to the controller 360 (connection not shown for simplicity), and provide signals proportional to the displacement of the left wing front gauge wheel hydraulic cylinders 342A, 342B, 342C, and 342D.

Each of the right wing rear lift wheel hydraulic cylinders 344A, 344B, 344C, and 344D is provided with a right wing rear lift wheel hydraulic cylinder displacement detecting device 366A, 366B, 366C, and 366D, respectively. The right wing rear lift wheel hydraulic cylinder displacement detecting devices 366A, 366B, 366C, and 366D are each connected to the controller 360 (connection not shown for simplicity), and provide signals proportional to the displacement of the right wing rear lift wheel hydraulic cylinders 344A, 344B, 344C, and 344D. Each of the left wing rear lift wheel hydraulic cylinders 346A, 346B, 346C, and 346D is provided with a left wing rear lift wheel hydraulic cylinder displacement detecting device 368A, 368B, 368C, and 368D, respectively. The left wing rear lift wheel hydraulic cylinder displacement detecting device 368A, 368B, 368C, and 368D are each connected to the controller 360 (connection not shown for simplicity), and provide signals proportional to the displacement of the left wing rear lift wheel hydraulic cylinders 346A, 346B, 346C, and 346D.

In addition to the displacement signal, a signal reflecting the rate of change of displacement, or $\Delta D/\Delta T$, may be provided by the hydraulic cylinder displacement detecting devices 362A, 362B, 362C, 362D, 364A, 364B, 364C, 364D, 366A, 366B, 366C, 366D, 368A, 368B, 368C, and 368D. A rheostat type of sensor is shown in FIG. 3, although any kind of sensor producing an output proportional to sensed displacement and/or rate of change of displacement may be used. As shown in FIG. 3, the hydraulic cylinder displacement detecting devices 362A, 362B, 362C, 362D, 364A, 364B, 364C, 364D, 366A, 366B, 366C, 366D, 368A, 368B, 368C, and 368D incorporate both displacement sensing and rate of change of displacement sensing functions, although individual sensors may be used for each of the displacement sensing and rate of change of displacement sensing functions.

The controller 360 may calibrate the right wing front gauge wheel hydraulic cylinders 340A, 340B, 340C, and 340D, the left wing front gauge wheel hydraulic cylinders 342A, 342B, 342C, and 342D, the right wing rear lift wheel hydraulic cylinders 344A, 344B, 344C, and 344D, and the left wing rear lift wheel hydraulic cylinders 346A, 346B, 346C, and 346D by first extending each to its maximum length. This ensures that any air entrained in the system due to assembly or other reason is passed to the hydraulic system. Individual readings are then taken from the hydraulic cylinder displacement detecting devices 362A, 362B, 362C, 362D, 364A, 364B, 364C, 364D, 366A, 366B, 366C, 366D, 368A, 368B, 368C, and 368D. The agricultural tillage implement 10 is then lowered so that the tools, in this embodiment the cultivator shanks 36, just touch the level surface. Once this condition is achieved, individual readings are again taken from the hydraulic cylinder displacement detecting devices 362A, 362B, 362C, 362D, 364A, 364B, 364C, 364D, 366A, 366B, 366C, 366D, 368A, 368B, 368C, and 368D. These displacement signals are then stored in the controller 360, and provide the synchronized set point for the displacement detecting devices 362A, 362B, 362C, 362D, 364A, 364B, 364C, 364D, 366A, 366B, 366C, 366D, 368A, 368B, 368C, and 368D. Alternately, other reference planes than that defined by contact between the tools and a level surface may be used.

Periodically during the operation of the agricultural tillage implement 10, the readings of the hydraulic cylinder displacement detecting devices 362A, 362B, 362C, 362D, 364A, 364B, 364C, 364D, 366A, 366B, 366C, 366D, 368A, 368B, 368C, and 368D are determined and, if they deviate from the set point initially established, the controller 360 corrects the appropriate hydraulic cylinder 340A, 340B, 340C, 340D, 342A, 342B, 342C, 342D, 344A, 344B, 344C, 344D, 346A, 346B, 346C, or 346D to achieve the intended set point. This may be done independently of other hydraulic cylinders using the methods described previously. The agricultural tillage implement 10 is then able to provide accurate depth of penetration of the tools, in this embodiment the cultivator shanks 36.

The implement may additionally be adjusted in the field. In this procedure, the operator prepares a test run into the soil in a field and then measures the depth of the penetration of the tools. To the extent that it is necessary to make a minor adjustment, the individual hydraulic cylinder that is out of sync with the remaining hydraulic cylinders is adjusted and a new set point is established as the level uniform plane. This ensures that field conditions such as wheel loading and other factors have a minimal and easily correctable impact on the tillage operation. In addition, the hydraulic cylinders are corrected for the differential rate of displacement change $\Delta D/\Delta T$ so that the entry of the tools is uniform at the beginning of the field and the withdrawal is uniform at the end of the field. The process of recalibration may be made automatic so that it does not interfere with the immediate operator directed tillage over a field and preparing the soil.

Figure 4:
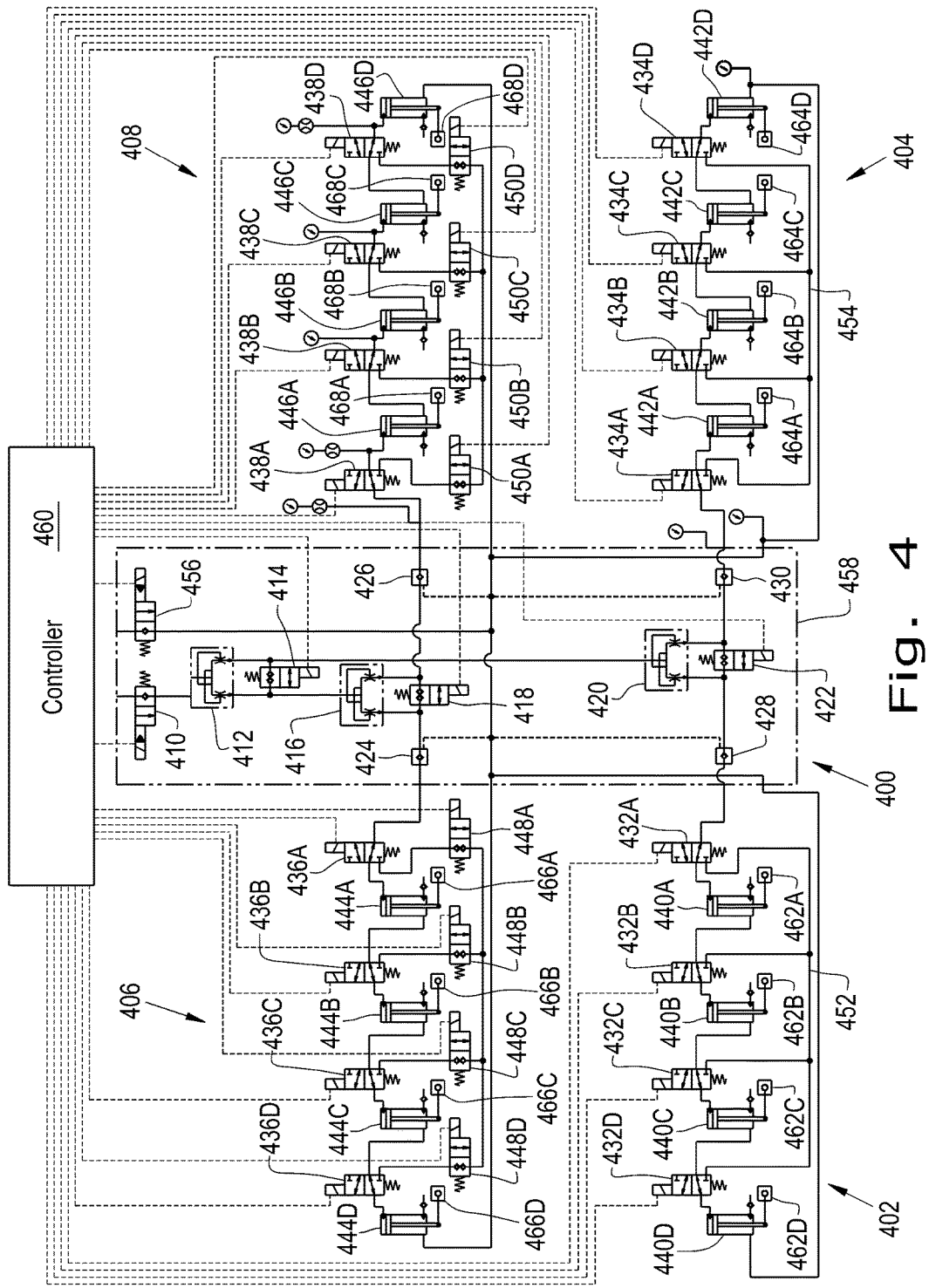
FIG. 4 is a schematic illustration of a tillage implement hydraulic system according to another embodiment of the present invention.

Turning now to FIG. 4, a schematic illustration of a tillage implement hydraulic system 400 according to another embodiment of the present invention is shown. The tillage implement hydraulic system 400 includes a right wing front gauge wheel hydraulic subsystem 402, a left wing front gauge wheel hydraulic subsystem 404, a right wing rear lift wheel hydraulic subsystem 406, and a left wing rear lift wheel hydraulic subsystem 408. Hydraulic pressure and flow is selectively admitted to the tillage implement hydraulic system 400 by a first solenoid operated normally closed directional control check valve with manual override 410, whereupon the hydraulic pressure and flow proceeds to a first hydraulic flow divider and combiner 412, which splits the hydraulic flow between the rear lift wheel hydraulic subsystems 406, 408, and the front gauge wheel hydraulic subsystems 402, 404, respectively. The first hydraulic flow divider and combiner 412 may split the hydraulic flow between the rear lift wheel hydraulic subsystems 406, 408, and the front gauge wheel hydraulic subsystems 402, 404, in a 60/40 ratio, as a non-limiting example. A first solenoid operated normally closed two way poppet bypass valve 414 interconnects the hydraulic flow proceeding to the rear lift wheel hydraulic subsystems 406, 408, and to the front gauge wheel hydraulic subsystems 402, 404, subsequent to its division by the first hydraulic flow divider and combiner 412, which first solenoid operated normally closed two way poppet bypass valve 414 may selectively rejoin the flow proceeding from the first hydraulic flow divider and combiner 412 for use in one or the other of the rear lift wheel hydraulic subsystems 406, 408, or the front gauge wheel hydraulic subsystems 402, 404, according to need. In this way, actuation of hydraulic cylinders within the rear lift wheel hydraulic subsystems 406, 408, and within the front gauge wheel hydraulic subsystems 402, 404 may be accomplished in coordinated fashion by use of the first hydraulic flow divider and combiner 412, or may be accomplished selectively by rejoining the flow proceeding from the first hydraulic flow divider and combiner 412 using the first solenoid operated normally closed two way poppet bypass valve 414.

The hydraulic flow proceeding to the rear lift wheel hydraulic subsystems 406, 408, is then further split in a second hydraulic flow divider and combiner 416, which splits the hydraulic flow between the right wing rear lift wheel hydraulic subsystem 406 and the left wing rear lift wheel hydraulic subsystem 408. A second solenoid operated normally closed two way poppet bypass valve 418 interconnects the hydraulic flow proceeding to the right wing rear lift wheel hydraulic subsystem 406 and to the left wing rear lift wheel hydraulic subsystem 408, subsequent to its division by the second hydraulic flow divider and combiner 416, which second solenoid operated normally closed two way poppet bypass valve 418 may selectively rejoin the flow proceeding from the second hydraulic flow divider and combiner 416 for use in one or the other of the right wing rear lift wheel hydraulic subsystem 406 or the left wing rear lift wheel hydraulic subsystem 408, according to need. In this way, actuation of hydraulic cylinders within the right wing rear lift wheel hydraulic subsystem 406 and within the left wing rear lift wheel hydraulic subsystem 408 may be accomplished in coordinated fashion by use of the second hydraulic flow divider and combiner 416, or may be accomplished selectively by rejoining the flow proceeding from the second hydraulic flow divider and combiner 416 using the second solenoid operated normally closed two way poppet bypass valve 418.

The hydraulic flow proceeding to the front gauge wheel hydraulic subsystems 402, 404, is then further split in a third hydraulic flow divider and combiner 420, which splits the hydraulic flow between the right wing front gauge wheel hydraulic subsystem 402 and the left wing front gauge wheel hydraulic subsystem 404. A third solenoid operated normally closed two way poppet bypass valve 422 interconnects the hydraulic flow proceeding to the right wing front gauge wheel hydraulic subsystem 402 and the left wing front gauge wheel hydraulic subsystem 404, subsequent to its division by the third hydraulic flow divider and combiner 420, which third solenoid operated normally closed two way poppet bypass valve 422 may selectively rejoin the flow proceeding from the third hydraulic flow divider and combiner 420 for use in one or the other of the right wing front gauge wheel hydraulic subsystem 402 or the left wing front gauge wheel hydraulic subsystem 404, according to need. In this way, actuation of hydraulic cylinders within the right wing front gauge wheel hydraulic subsystem 402 and within the right wing front gauge wheel hydraulic subsystem 404 may be accomplished in coordinated fashion by use of the third hydraulic flow divider and combiner 420, or may be accomplished selectively by rejoining the flow proceeding from the third hydraulic flow divider and combiner 420 using the third solenoid operated normally closed two way poppet bypass valve 422.

Hydraulic flow and pressure proceeding from the second hydraulic flow divider and combiner 416 and/or the second solenoid operated normally closed two way poppet bypass valve 418 then passes through a first pilot operated check valve 424 or a second pilot operated check valve 426 before proceeding to the right wing rear lift wheel hydraulic subsystem 406 or to the left wing rear lift wheel hydraulic subsystem 408, respectively. Hydraulic flow and pressure proceeding from the third hydraulic flow divider and combiner 420 and/or the third solenoid operated normally closed two way poppet bypass valve 422 then passes through a third pilot operated check valve 428 or a fourth pilot operated check valve 430 before proceeding to the right wing front gauge wheel hydraulic subsystem 402 or the left wing front gauge wheel hydraulic subsystem 404, respectively.

Each of the first solenoid operated normally closed directional control check valve with manual override 410, the first hydraulic flow divider and combiner 412, the first solenoid operated normally closed two way poppet bypass valve 414, the second hydraulic flow divider and combiner 416, the second solenoid operated normally closed two way poppet bypass valve 418, the third hydraulic flow divider and combiner 420, the third solenoid operated normally closed two way poppet bypass valve 422, the first pilot operated check valve 424, the second pilot operated check valve 426, the third pilot operated check valve 428, and the fourth pilot operated check valve 430 may be contained within a manifold 458.

The right wing front gauge wheel hydraulic subsystem 402 has at least one right wing front gauge wheel hydraulic cylinder 440, four being illustrated in the embodiment of the invention shown in FIG. 4, as a non-limiting example, each of which is selectively supplied with hydraulic flow and pressure using a right wing front gauge wheel hydraulic cylinder three way solenoid valve with internal check valve 432. Right wing front gauge wheel hydraulic cylinder 440A may correspond to hydraulic cylinder 62 actuating the gauge wheel assembly 56 on the forward right corner of the main shank frame 28 shown in FIG. 1. Right wing front gauge wheel hydraulic cylinders 440B, 440C, and 440D may correspond to hydraulic cylinders 64 actuating the gauge wheel assemblies 70 on right inner wing front shank frame 66B, right middle wing front shank frame 66D, and right outer wing front shank frame 66F, respectively, shown in FIG. 1. Alternately, each of the right wing front gauge wheel hydraulic cylinders 440A, 440B, 440C, and 440D may correspond to hydraulic cylinders 64 actuating gauge wheel assemblies 70 on right wing shank frames. Right wing front gauge wheel hydraulic cylinders 440A, 440B, 440C, and 440D are used to control the depth of the cultivator shanks 36 on the main shank frame 28, right inner wing front shank frame 66B, right middle wing front shank frame 66D, and right outer wing front shank frame 66F.

The first right wing front gauge wheel hydraulic cylinder three way solenoid valve with internal check valve 432A shown in FIG. 4 is configured to normally apply hydraulic flow and pressure received from the third pilot operated check valve 428 to the right wing front gauge wheel hydraulic cylinder 440A, and upon energization to divert the hydraulic flow and pressure to a right wing front gauge wheel bypass circuit 452. Each of the subsequent right wing front gauge wheel hydraulic cylinder three way solenoid valves with internal check valve 432B, 432C, 432D is configured to normally apply hydraulic flow and pressure received from the previous right wing front gauge wheel hydraulic cylinders 440A, 440B, 440C, respectively, to its own right wing front gauge wheel hydraulic cylinder 440B, 440C, 440D, respectively. Upon energization, each of the subsequent right wing front gauge wheel hydraulic cylinder three way solenoid valves with internal check valves 432B, 432C, 432D is configured to apply hydraulic flow and pressure received from right wing front gauge wheel bypass circuit 452 to its own right wing front gauge wheel hydraulic cylinder 440B, 440C, 440D, respectively.

In this way, the actuation of the right wing front gauge wheel hydraulic cylinders 440A, 440B, 440C, and 440D may be coordinated by leaving the right wing front gauge wheel hydraulic cylinder three way solenoid valves 432A, 432B, 432C, and 432D de-energized so that displacement of each of right wing front gauge wheel hydraulic cylinders 440A, 440B, and 440C forces hydraulic fluid into each of subsequent right wing front gauge wheel hydraulic cylinders 440B, 440C, and 440D, respectively, resulting in coordinated motion. The use of right wing front gauge wheel hydraulic cylinder three way solenoid valves with internal check valves 432A, 432B, 432C, and 432D reduces leakage and minimizes the number of adjustments of right wing front gauge wheel hydraulic cylinders 440A, 440B, 440C, and 440D are needed to maintain the depth of the cultivator shanks 36 on the main shank frame 28, right inner wing front shank frame 66B, right middle wing front shank frame 66D, and right outer wing front shank frame 66F. When it is desired to bypass adjustment of right wing front gauge wheel hydraulic cylinder 440A, right wing front gauge wheel hydraulic cylinder three way solenoid valves 432A and 432B are energized, thereby bypassing right wing front gauge wheel hydraulic cylinder 440A and actuating remaining right wing front gauge wheel hydraulic cylinders 440B, 440C, and 440D. Similarly, if it is desired to bypass adjustment of right wing front gauge wheel hydraulic cylinders 440A and 440B, right wing front gauge wheel hydraulic cylinder three way solenoid valves 432A and 432C are energized, thereby bypassing right wing front gauge wheel hydraulic cylinders 440A and 440B, and actuating remaining right wing front gauge wheel hydraulic cylinders 440C and 440D. If it is desired to bypass adjustment of right wing front gauge wheel hydraulic cylinders 440A, 440B, and 440C, right wing front gauge wheel hydraulic cylinder three way solenoid valves 432A and 432D are energized, thereby bypassing right wing front gauge wheel hydraulic cylinders 440A, 440B, and 440C, and actuating remaining right wing front gauge wheel hydraulic cylinder 440D.

Similarly, the left wing front gauge wheel hydraulic subsystem 404 has at least one left wing front gauge wheel hydraulic cylinder 442, four being illustrated in the embodiment of the invention shown in FIG. 4, as a non-limiting example, each of which is selectively supplied with hydraulic flow and pressure using a left wing front gauge wheel hydraulic cylinder three way solenoid valve with internal check valve 434. Left wing front gauge wheel hydraulic cylinder 442A may correspond to hydraulic cylinder 62 actuating the gauge wheel assembly 56 on the forward left corner of the main shank frame 28 shown in FIG. 1. Left wing front gauge wheel hydraulic cylinders 442B, 442C, and 442D may correspond to hydraulic cylinders 64 actuating the gauge wheel assemblies 70 on left inner wing front shank frame 66A, left middle wing front shank frame 66C, and left outer wing front shank frame 66E, respectively, shown in FIG. 1. Alternately, each of the left wing front gauge wheel hydraulic cylinders 442A, 442B, 442C, and 442D may correspond to hydraulic cylinders 64 actuating gauge wheel assemblies 70 on left wing shank frames. Left wing front gauge wheel hydraulic cylinders 442A, 442B, 442C, and 442D are used to control the depth of the cultivator shanks 36 on the main shank frame 28, right inner wing front shank frame 66B, right middle wing front shank frame 66D, and right outer wing front shank frame 66F.

The first left wing front gauge wheel hydraulic cylinder three way solenoid valve with internal check valve 434A is configured to normally apply hydraulic flow and pressure received from the fourth pilot operated check valve 430 to the left wing front gauge wheel hydraulic cylinder 442A, and upon energization to divert the hydraulic flow and pressure to a left wing front gauge wheel bypass circuit 454. Each of the subsequent left wing front gauge wheel hydraulic cylinder three way solenoid valves with internal check valves 434B, 434C, 434D is configured to normally apply hydraulic flow and pressure received from the previous left wing front gauge wheel hydraulic cylinders 442A, 442B, 442C, respectively, to its own left wing front gauge wheel hydraulic cylinder 442B, 442C, 442D, respectively. Upon energization, each of the subsequent left wing front gauge wheel hydraulic cylinder three way solenoid valves with internal check valves 434B, 434C, 434D is configured to apply hydraulic flow and pressure received from left wing front gauge wheel bypass circuit 454 to its own left wing front gauge wheel hydraulic cylinder 442B, 442C, 442D, respectively.

In this way, the actuation of the left wing front gauge wheel hydraulic cylinders 442A, 442B, 442C, and 442D may be coordinated by leaving the left wing front gauge wheel hydraulic cylinder three way solenoid valves 434A, 434B, 434C, and 434D de-energized so that displacement of each of left wing front gauge wheel hydraulic cylinders 442A, 442B, and 442C forces hydraulic fluid into each of subsequent left wing front gauge wheel hydraulic cylinders 442B, 442C, and 442D, respectively, resulting in coordinated motion. The use of left wing front gauge wheel hydraulic cylinder three way solenoid valves with internal check valves 434A, 434B, 434C, and 434D reduces leakage and minimizes the number of adjustments of left wing front gauge wheel hydraulic cylinders 442A, 442B, 442C, and 442D are needed to maintain the depth of the cultivator shanks 36 on the main shank frame 28, left inner wing front shank frame 66A, left middle wing front shank frame 66C, and left outer wing front shank frame 66E. When it is desired to bypass adjustment of left wing front gauge wheel hydraulic cylinder 442A, left wing front gauge wheel hydraulic cylinder three way solenoid valves 434A and 434B are energized, thereby bypassing left wing front gauge wheel hydraulic cylinder 442A and actuating remaining left wing front gauge wheel hydraulic cylinders 442B, 442C, and 442D. Similarly, if it is desired to bypass adjustment of left wing front gauge wheel hydraulic cylinders 442A and 442B, left wing front gauge wheel hydraulic cylinder three way solenoid valves 434A and 434C are energized, thereby bypassing left wing front gauge wheel hydraulic cylinders 442A and 442B, and actuating remaining left wing front gauge wheel hydraulic cylinders 442C and 442D. If it is desired to bypass adjustment of left wing front gauge wheel hydraulic cylinders 442A, 442B, and 442C, left wing front gauge wheel hydraulic cylinder three way solenoid valves 434A and 434D are energized, thereby bypassing left wing front gauge wheel hydraulic cylinders 442A, 442B, and 442C, and actuating remaining left wing front gauge wheel hydraulic cylinder 442D.

Similarly, the right wing rear lift wheel hydraulic subsystem 406 has at least one right wing rear lift wheel hydraulic cylinder 444, four being illustrated in the embodiment of the invention shown in FIG. 4, as a non-limiting example, each of which is selectively supplied with hydraulic flow and pressure using a right wing rear lift wheel hydraulic cylinder three way solenoid valve 436. Right wing rear lift wheel hydraulic cylinder 444A may correspond to a right hand hydraulic cylinder 54 actuating the rear lift wheels 52 on an embodiment wherein there are at least two such hydraulic cylinders 54 actuating the rear lift wheels 52 independently. Right wing rear lift wheel hydraulic cylinders 444B, 444C, and 444D may correspond to hydraulic cylinders 60 actuating wing lift wheels 53 on right inner wing section 14B, right middle wing section 16B, and right outer wing section 18B, respectively, shown in FIG. 1. Alternately, each of the right wing rear lift wheel hydraulic cylinders 444A, 444B, 444C, and 444D may correspond to hydraulic cylinders 60 actuating lift wheels 53 on right wing sections 14B, 16B, 18B. Right wing rear lift wheel hydraulic cylinders 444A, 444B, 444C, and 444D are used to control the depth of the cultivator shanks 36 and spring tooth drags 32 attached to the rear auxiliary implements 30 and 78.

The first right wing rear lift wheel hydraulic cylinder three way solenoid valve 436A shown in FIG. 4 is configured to normally apply hydraulic flow and pressure received from the first pilot operated check valve 424 to the right wing rear lift wheel hydraulic cylinder 444A, and upon energization to divert the hydraulic flow and pressure to a right wing rear lift wheel bypass valve 448A. Each of the subsequent right wing rear lift wheel hydraulic cylinder three way solenoid valves 436B, 436C, 436D is configured to normally apply hydraulic flow and pressure received from the previous right wing rear lift wheel hydraulic cylinders 444A, 444B, 444C, respectively, to its own right wing rear lift wheel hydraulic cylinders 444B, 444C, 444D, respectively. Upon energization, each of the subsequent right wing rear lift wheel hydraulic cylinder three way solenoid valves 436B, 436C, 436D is configured to apply hydraulic flow and pressure received from right wing rear lift wheel bypass valve 448A via respective right wing rear lift wheel bypass valve 448B, 448C, 448D, respectively, to its own right wing rear lift wheel hydraulic cylinders 444B, 444C, 444D, respectively.

In this way, the actuation of the right wing rear lift wheel hydraulic cylinders 444A, 444B, 444C, and 444D may be coordinated by leaving the right wing rear lift wheel hydraulic cylinder three way solenoid valves 436A, 436B, 436C, and 436D de-energized so that displacement of each of right wing rear lift wheel hydraulic cylinders 444A, 444B, and 444C forces hydraulic fluid into each of subsequent right wing rear lift wheel hydraulic cylinders 444B, 444C, and 444D, respectively, resulting in coordinated motion. When it is desired to bypass adjustment of right wing rear lift wheel hydraulic cylinder 444A, right wing rear lift wheel hydraulic cylinder three way solenoid valves 436A and 436B are energized, along with right wing rear lift wheel bypass valves 448A and 448B, thereby bypassing right wing rear lift wheel hydraulic cylinder 444A and actuating remaining right wing rear lift wheel hydraulic cylinders 444B, 444C, and 444D. Similarly if it is desired to bypass adjustment of right wing rear lift wheel hydraulic cylinders 444A and 444B, right wing rear lift wheel hydraulic cylinder three way solenoid valves 436A and 436C are energized, along with right wing rear lift wheel bypass valves 448A and 448C, thereby bypassing right wing rear lift wheel hydraulic cylinders 444A and 444B and actuating remaining right wing rear lift wheel hydraulic cylinders 444C and 444D. Similarly if it is desired to bypass adjustment of right wing rear lift wheel hydraulic cylinders 444A, 444B, and 444C, right wing rear lift wheel hydraulic cylinder three way solenoid valves 436A and 436D are energized, along with right wing rear lift wheel bypass valves 448A and 448D, thereby bypassing right wing rear lift wheel hydraulic cylinders 444A, 444B, and 444C, and actuating remaining right wing rear lift wheel hydraulic cylinder 444D. Additionally, the right wing rear lift wheel bypass valves 448A, 448B, 448C, and 448D may assist in limiting leakage from right wing rear lift wheel hydraulic cylinder three way solenoid valves 436A, 436B, 436C, and 436D.

Similarly, the left wing rear lift wheel hydraulic subsystem 408 has at least one left wing rear lift wheel hydraulic cylinder 446, four being illustrated in the embodiment of the invention shown in FIG. 4, as a non-limiting example, each of which is selectively supplied with hydraulic flow and pressure using a left wing rear lift wheel hydraulic cylinder three way solenoid valve 438. Left wing rear lift wheel hydraulic cylinder 446A may correspond to a left hand hydraulic cylinder 54 actuating the rear lift wheels 52 on an embodiment wherein there are at least two such hydraulic cylinders 54 actuating the rear lift wheels 52 independently. Left wing rear lift wheel hydraulic cylinders 446B, 446C, and 446D may correspond to hydraulic cylinders 60 actuating wing lift wheels 53 on left inner wing section 14A, left middle wing section 16A, and left outer wing section 18A, respectively, shown in FIG. 1. Alternately, each of the left wing rear lift wheel hydraulic cylinders 446A, 446B, 446C, and 446D may correspond to hydraulic cylinders 60 actuating lift wheels 53 on left wing sections 14A, 16A, 18A. Left wing rear lift wheel hydraulic cylinders 446A, 446B, 446C, and 446D are used to control the depth of the cultivator shanks 36 and spring tooth drags 32 attached to the rear auxiliary implements 30 and 78.

The first left wing rear lift wheel hydraulic cylinder three way solenoid valve 438A shown in FIG. 4 is configured to normally apply hydraulic flow and pressure received from the second pilot operated check valve 426 to the left wing rear lift wheel hydraulic cylinder 446A, and upon energization to divert the hydraulic flow and pressure to a left wing rear lift wheel bypass valve 450A. Each of the subsequent left wing rear lift wheel hydraulic cylinder three way solenoid valves 438B, 438C, 438D is configured to normally apply hydraulic flow and pressure received from the previous left wing rear lift wheel hydraulic cylinders 446A, 446B, 446C, respectively, to its own left wing rear lift wheel hydraulic cylinders 446B, 446C, 446D, respectively. Upon energization, each of the subsequent left wing rear lift wheel hydraulic cylinder three way solenoid valves 438B, 438C, 438D is configured to apply hydraulic flow and pressure received from left wing rear lift wheel bypass valve 450A via respective left wing rear lift wheel bypass valve 450B, 450C, 450D, respectively, to its own left wing rear lift wheel hydraulic cylinders 446B, 446C, 446D, respectively.

In this way, the actuation of the left wing rear lift wheel hydraulic cylinders 446A, 446B, 446C, and 446D may be coordinated by leaving the left wing rear lift wheel hydraulic cylinder three way solenoid valves 438A, 438B, 438C, and 438D de-energized so that displacement of each of left wing rear lift wheel hydraulic cylinders 446A, 446B, and 446C forces hydraulic fluid into each of subsequent left wing rear lift wheel hydraulic cylinders 446B, 446C, and 446D, respectively, resulting in coordinated motion. When it is desired to bypass adjustment of left wing rear lift wheel hydraulic cylinder 446A, left wing rear lift wheel hydraulic cylinder three way solenoid valves 438A and 438B are energized, along with left wing rear lift wheel bypass valves 450A and 450B, thereby bypassing left wing rear lift wheel hydraulic cylinder 446A and actuating remaining left wing rear lift wheel hydraulic cylinders 446B, 446C, and 446D. Similarly, if it is desired to bypass adjustment of left wing rear lift wheel hydraulic cylinders 446A and 446B, left wing rear lift wheel hydraulic cylinder three way solenoid valves 438A and 438C are energized, along with left wing rear lift wheel bypass valves 450A and 450C, thereby bypassing left wing rear lift wheel hydraulic cylinders 446A and 446B and actuating remaining left wing rear lift wheel hydraulic cylinders 446C and 446D. Similarly, if it is desired to bypass adjustment of left wing rear lift wheel hydraulic cylinders 446A, 446B, and 446C, left wing rear lift wheel hydraulic cylinder three way solenoid valves 438A and 438D are energized, along with left wing rear lift wheel bypass valves 450A and 450D, thereby bypassing left wing rear lift wheel hydraulic cylinders 446A, 446B, and 446C, and actuating remaining left wing rear lift wheel hydraulic cylinder 446D. Additionally, the left wing rear lift wheel bypass valves 450A, 450B, 450C, and 450D may assist in limiting leakage from left wing rear lift wheel hydraulic cylinder three way solenoid valves 438A, 438B, 438C, and 438D.

Note that for illustration purposes, all hydraulic cylinders shown in FIG. 4 are shown as acting in extension, although such hydraulic cylinders may instead act in retraction. Therefore, it is contemplated that any cylinder shown in the hydraulic diagram of FIG. 4 may be reversed in its direction of action, and still be within the scope of the present invention. Subsequent to right wing front gauge wheel hydraulic cylinder 440D, left wing front gauge wheel hydraulic cylinder 442D, right wing rear lift wheel hydraulic cylinder 444D, and left wing rear lift wheel hydraulic cylinder 446D, the hydraulic flow returns from tillage implement hydraulic system 400 via a second solenoid operated normally closed directional control check valve with manual override 456, which may be within manifold 458.

Each of the first solenoid operated normally closed directional control check valve with manual override 410, the first solenoid operated normally closed two way poppet bypass valve 414, the second solenoid operated normally closed two way poppet bypass valve 418, the third solenoid operated normally closed two way poppet bypass valve 422, the right wing front gauge wheel hydraulic cylinder three way solenoid valves 432A, 432B, 432C, and 432D, the left wing front gauge hydraulic cylinder three way solenoid valves 434A, 434B, 434C, and 434D, the right wing rear lift wheel hydraulic cylinder three way solenoid valves 436A, 436B, 436C, and 436D, the left wing rear lift wheel hydraulic cylinder three way solenoid valves 438A, 438B, 438C, and 438D, the right wing rear lift wheel bypass valves 448A, 448B, 448C, and 448D, the left wing rear lift wheel bypass valves 450A, 450B, 450C, and 450D, and the second solenoid operated normally closed directional control check valve with manual override 456 are connected to a controller 460.

The controller 460 is operable to selectively coordinate the hydraulic cylinders of the right wing front gauge wheel hydraulic subsystem 402, the left wing front gauge wheel hydraulic subsystem 404, the right wing rear lift wheel hydraulic subsystem 406, and the left wing rear lift wheel hydraulic subsystem 408 using the first solenoid operated normally closed two way poppet bypass valve 414, the second solenoid operated normally closed two way poppet bypass valve 418, and the third solenoid operated normally closed two way poppet bypass valve 422, as described previously.

The controller 460 is further operable to selectively coordinate the right wing front gauge wheel hydraulic cylinders 440A, 440B, 440C, and 440D using the right wing front gauge wheel hydraulic cylinder three way solenoid valves 432A, 432B, 432C, and 432D, as described previously. The controller 460 is further operable to selectively coordinate the left wing front gauge wheel hydraulic cylinders 442A, 442B, 442C, and 442D using the left wing front gauge hydraulic cylinder three way solenoid valves 434A, 434B, 434C, and 434D, as described previously. The controller 460 is further operable to selectively coordinate the right wing rear lift wheel hydraulic cylinders 444A, 444B, 444C, and 444D using the right wing rear lift wheel hydraulic cylinder three way solenoid valves 436A, 436B, 436C, and 436D, and the right wing rear lift wheel bypass valves 448A, 448B, 448C, and 448D, as described previously. The controller 460 is further operable to selectively coordinate the left wing rear lift wheel hydraulic cylinders 446A, 446B, 446C, and 446D using the left wing rear lift wheel hydraulic cylinder three way solenoid valves 438A, 438B, 438C, and 438D, and the left wing rear lift wheel bypass valves 450A, 450B, 450C, and 450D, as described previously.

Each of the right wing front gauge wheel hydraulic cylinders 440A, 440B, 440C, and 440D is provided with a right wing front gauge wheel hydraulic cylinder displacement detecting device 462A, 462B, 462C, and 462D, respectively. The right wing front gauge wheel hydraulic cylinder displacement detecting devices 462A, 462B, 462C, and 462D are each connected to the controller 460 (connection not shown for simplicity), and provide signals proportional to the displacement of the right wing front gauge wheel hydraulic cylinders 440A, 440B, 440C, 440D. Each of the left wing front gauge wheel hydraulic cylinders 442A, 442B, 442C, and 442D is provided with a left wing front gauge wheel hydraulic cylinder displacement detecting device 464A, 464B, 464C, and 464D, respectively. The left wing front gauge wheel hydraulic cylinder displacement detecting devices 464A, 464B, 464C, and 464D are each connected to the controller 460 (connection not shown for simplicity), and provide signals proportional to the displacement of the left wing front gauge wheel hydraulic cylinders 442A, 442B, 442C, and 442D.

Each of the right wing rear lift wheel hydraulic cylinders 444A, 444B, 444C, and 444D is provided with a right wing rear lift wheel hydraulic cylinder displacement detecting device 466A, 466B, 466C, and 466D, respectively. The right wing rear lift wheel hydraulic cylinder displacement detecting devices 466A, 466B, 466C, and 466D are each connected to the controller 460 (connection not shown for simplicity), and provide signals proportional to the displacement of the right wing rear lift wheel hydraulic cylinders 444A, 444B, 444C, and 444D. Each of the left wing rear lift wheel hydraulic cylinders 446A, 446B, 446C, and 446D is provided with a left wing rear lift wheel hydraulic cylinder displacement detecting device 468A, 468B, 468C, and 468D, respectively. The left wing rear lift wheel hydraulic cylinder displacement detecting device 468A, 468B, 468C, and 468D are each connected to the controller 460 (connection not shown for simplicity), and provide signals proportional to the displacement of the left wing rear lift wheel hydraulic cylinders 446A, 446B, 446C, and 446D.

In addition to the displacement signal, a signal reflecting the rate of change of displacement, or $\Delta D/\Delta T$, may be provided by the hydraulic cylinder displacement detecting devices 462A, 462B, 462C, 462D, 464A, 464B, 464C, 464D, 466A, 466B, 466C, 466D, 468A, 468B, 468C, and 468D. A rheostat type of sensor is shown in FIG. 4, although any kind of sensor producing an output proportional to sensed displacement and/or rate of change of displacement may be used. As shown in FIG. 4, the hydraulic cylinder displacement detecting devices 462A, 462B, 462C, 462D, 464A, 464B, 464C, 464D, 466A, 466B, 466C, 466D, 468A, 468B, 468C, and 468D incorporate both displacement sensing and rate of change of displacement sensing functions, although individual sensors may be used for each of the displacement sensing and rate of change of displacement sensing functions.

The controller 460 may again calibrate the right wing front gauge wheel hydraulic cylinders 440A, 440B, 440C, and 440D, the left wing front gauge wheel hydraulic cylinders 442A, 442B, 442C, and 442D, the right wing rear lift wheel hydraulic cylinders 444A, 444B, 444C, and 444D, and the left wing rear lift wheel hydraulic cylinders 446A, 446B, 446C, and 446D by first extending each to its maximum length, similar to the controller 360 in FIG. 3. Individual readings are then taken from the hydraulic cylinder displacement detecting devices 462A, 462B, 462C, 462D, 464A, 464B, 464C, 464D, 466A, 466B, 466C, 466D, 468A, 468B, 468C, and 468D. The agricultural tillage implement 10 is then lowered so that the tools, in this embodiment the cultivator shanks 36, just touch the level surface. Once this condition is achieved, individual readings are again taken from the hydraulic cylinder displacement detecting devices 462A, 462B, 462C, 462D, 464A, 464B, 464C, 464D, 466A, 466B, 466C, 466D, 468A, 468B, 468C, and 468D. These displacement signals are then stored in the controller 460, and provide the synchronized set point for the displacement detecting devices 462A, 462B, 462C, 462D, 464A, 464B, 464C, 464D, 466A, 466B, 466C, 466D, 468A, 468B, 468C, and 468D. Alternately, other reference planes than that defined by contact between the tools and a level surface may be used.

As with the controller 360, the controller 460 may periodically during the operation of the agricultural tillage implement 10, take the readings of the hydraulic cylinder displacement detecting devices 462A, 462B, 462C, 462D, 464A, 464B, 464C, 464D, 466A, 466B, 466C, 466D, 468A, 468B, 468C, and 468D and, if they deviate from the set point initially established, the controller 460 corrects the appropriate hydraulic cylinder 440A, 440B, 440C, 440D, 442A, 442B, 442C, 442D, 444A, 444B, 444C, 444D, 446A, 446B, 446C, or 446D to achieve the intended set point. This may be done independently of other hydraulic cylinders using the methods described previously. The agricultural tillage implement 10 is then able to provide accurate depth of penetration of the tools, in this embodiment the cultivator shanks 36.

As before, the implement may additionally be adjusted in the field. Again, the operator prepares a test run into the soil in a field and then measures the depth of the penetration of the tools. To the extent that it is necessary to make a minor adjustment, the individual hydraulic cylinder that is out of sync with the remaining hydraulic cylinders is adjusted and a new set point is established as the level uniform plane. This ensures that field conditions such as wheel loading and other factors have a minimal and easily correctable impact on the tillage operation. In addition, the hydraulic cylinders are corrected for the differential rate of displacement change $\Delta D/\Delta T$ so that the entry of the tools is uniform at the beginning of the field and the withdrawal is uniform at the end of the field. The process of recalibration may be made automatic so that it does not interfere with the immediate operator directed tillage over a field and preparing the soil.

Figure 5:
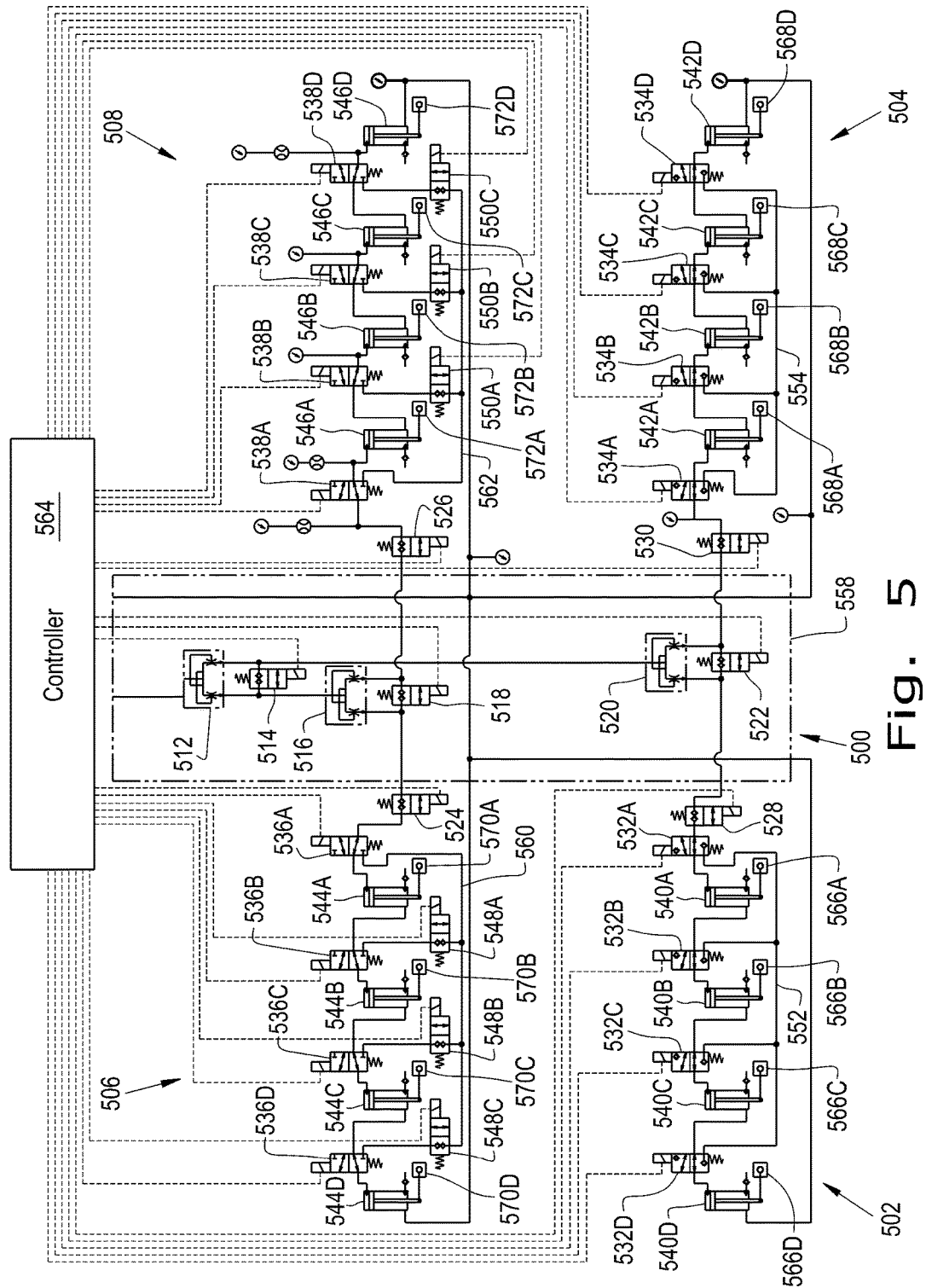
FIG. 5 is a schematic illustration of a tillage implement hydraulic system according to another embodiment of the present invention.

Turning now to FIG. 5, a schematic illustration of a tillage implement hydraulic system 500 according to another embodiment of the present invention is shown. The tillage implement hydraulic system 500 includes a right wing front gauge wheel hydraulic subsystem 502, a left wing front gauge wheel hydraulic subsystem 504, a right wing rear lift wheel hydraulic subsystem 506, and a left wing rear lift wheel hydraulic subsystem 508. Hydraulic pressure and flow is admitted to the tillage implement hydraulic system 500, whereupon the hydraulic pressure and flow proceeds to a first hydraulic flow divider and combiner 512, which splits the hydraulic flow between the rear lift wheel hydraulic subsystems 506, 508, and the front gauge wheel hydraulic subsystems 502, 504, respectively. The first hydraulic flow divider and combiner 512 may split the hydraulic flow between the rear lift wheel hydraulic subsystems 506, 508, and the front gauge wheel hydraulic subsystems 502, 504, in a 60/40 ratio, as a non-limiting example. A first solenoid operated normally closed two way poppet bypass valve 514 interconnects the hydraulic flow proceeding to the rear lift wheel hydraulic subsystems 506, 508, and to the gauge wheel hydraulic subsystems 502, 504, subsequent to its division by the first hydraulic flow divider and combiner 512, which first solenoid operated normally closed two way poppet bypass valve 514 may selectively rejoin the flow proceeding from the first hydraulic flow divider and combiner 512 for use in one or the other of the rear lift wheel hydraulic subsystems 506, 508, or the front gauge wheel hydraulic subsystems 502, 504, according to need. In this way, actuation of hydraulic cylinders within the rear lift wheel hydraulic subsystems 506, 508, and within the front gauge wheel hydraulic subsystems 502, 504 may be accomplished in coordinated fashion by use of the first hydraulic flow divider and combiner 512, or may be accomplished selectively by rejoining the flow proceeding from the first hydraulic flow divider and combiner 512 using the first solenoid operated normally closed two way poppet bypass valve 514, and then selectively actuating one or more of first solenoid operated normally closed two way poppet valve 524, second solenoid operated normally closed two way poppet valve 526, third solenoid operated normally closed two way poppet valve 528, or fourth solenoid operated normally closed two way poppet valve 530.

The hydraulic flow proceeding to the rear lift wheel hydraulic subsystems 506, 508, is then further split in a second hydraulic flow divider and combiner 516, which splits the hydraulic flow between the right wing rear lift wheel hydraulic subsystem 506 and the left wing rear lift wheel hydraulic subsystem 508. A second solenoid operated normally closed two way poppet bypass valve 518 interconnects the hydraulic flow proceeding to the right wing rear lift wheel hydraulic subsystem 506 and to the left wing rear lift wheel hydraulic subsystem 508, subsequent to its division by the second hydraulic flow divider and combiner 516, which second solenoid operated normally closed two way poppet bypass valve 518 may selectively rejoin the flow proceeding from the second hydraulic flow divider and combiner 516 for use in one or the other of the right wing rear lift wheel hydraulic subsystem 506 or the left wing rear lift wheel hydraulic subsystem 508, according to need. In this way, actuation of hydraulic cylinders within the right wing rear lift wheel hydraulic subsystem 506 and within the left wing rear lift wheel hydraulic subsystem 508 may be accomplished in coordinated fashion by use of the second hydraulic flow divider and combiner 516, or may be accomplished selectively by rejoining the flow proceeding from the second hydraulic flow divider and combiner 516 using the second solenoid operated normally closed two way poppet bypass valve 518, and then selectively actuating one or more of first solenoid operated normally closed two way poppet valve 524 or second solenoid operated normally closed two way poppet valve 526.

The hydraulic flow proceeding to the front gauge wheel hydraulic subsystems 502, 504, is then further split in a third hydraulic flow divider and combiner 520, which splits the hydraulic flow between the right wing front gauge wheel hydraulic subsystem 502 and the left wing front gauge wheel hydraulic subsystem 504. A third solenoid operated normally closed two way poppet bypass valve 522 interconnects the hydraulic flow proceeding to the right wing front gauge wheel hydraulic subsystem 502 and the left wing front gauge wheel hydraulic subsystem 504, subsequent to its division by the third hydraulic flow divider and combiner 520, which third solenoid operated normally closed two way poppet bypass valve 522 may selectively rejoin the flow proceeding from the third hydraulic flow divider and combiner 520 for use in one or the other of the right wing front gauge wheel hydraulic subsystem 502 or the left wing front gauge wheel hydraulic subsystem 504, according to need. In this way, actuation of hydraulic cylinders within the right wing front gauge wheel hydraulic subsystem 502 and within the right wing front gauge wheel hydraulic subsystem 504 may be accomplished in coordinated fashion by use of the third hydraulic flow divider and combiner 520, or may be accomplished selectively by rejoining the flow proceeding from the third hydraulic flow divider and combiner 520 using the third solenoid operated normally closed two way poppet bypass valve 522, and then selectively actuating one or more of third solenoid operated normally closed two way poppet valve 528 or fourth solenoid operated normally closed two way poppet valve 530.

Hydraulic flow and pressure proceeding from the second hydraulic flow divider and combiner 516 and/or the second solenoid operated normally closed two way poppet bypass valve 518 then passes through a first solenoid operated normally closed two way poppet valve 524 or a second solenoid operated normally closed two way poppet valve 526 before proceeding to the right wing rear lift wheel hydraulic subsystem 506 or to the left wing rear lift wheel hydraulic subsystem 508, respectively. Hydraulic flow and pressure proceeding from the third hydraulic flow divider and combiner 520 and/or the third solenoid operated normally closed two way poppet bypass valve 522 then passes through a third solenoid operated normally closed two way poppet valve 528 or a fourth solenoid operated normally closed two way poppet bypass valve 530 before proceeding to the right wing front gauge wheel hydraulic subsystem 502 or the left wing front gauge wheel hydraulic subsystem 504, respectively.

Each of the first hydraulic flow divider and combiner 512, the first solenoid operated normally closed two way poppet bypass valve 514, the second hydraulic flow divider and combiner 516, the second solenoid operated normally closed two way poppet bypass valve 518, the third hydraulic flow divider and combiner 520, and the third solenoid operated normally closed two way poppet bypass valve 522 may be contained within a manifold 558.

The right wing front gauge wheel hydraulic subsystem 502 has at least one right wing front gauge wheel hydraulic cylinder 540, four being illustrated in the embodiment of the invention shown in FIG. 5, as a non-limiting example, each of which is selectively supplied with hydraulic flow and pressure using a right wing front gauge wheel hydraulic cylinder three way solenoid valve with internal check valve 532. Right wing front gauge wheel hydraulic cylinder 540A may correspond to hydraulic cylinder 62 actuating the gauge wheel assembly 56 on the forward right corner of the main shank frame 28 shown in FIG. 1. Right wing front gauge wheel hydraulic cylinders 540B, 540C, and 540D may correspond to hydraulic cylinders 64 actuating the gauge wheel assemblies 70 on right inner wing front shank frame 66B, right middle wing front shank frame 66D, and right outer wing front shank frame 66F, respectively, shown in FIG. 1. Alternately, each of the right wing front gauge wheel hydraulic cylinders 540A, 540B, 540C, and 540D may correspond to hydraulic cylinders 64 actuating gauge wheel assemblies 70 on right wing shank frames. Right wing front gauge wheel hydraulic cylinders 540A, 540B, 540C, and 540D are used to control the depth of the cultivator shanks 36 on the main shank frame 28, right inner wing front shank frame 66B, right middle wing front shank frame 66D, and right outer wing front shank frame 66F.

The first right wing front gauge wheel hydraulic cylinder three way solenoid valve with internal check valve 532A shown in FIG. 5 is configured to normally apply hydraulic flow and pressure received from the third solenoid operated normally closed two way poppet valve 528 to the right wing front gauge wheel hydraulic cylinder 540A, and upon energization to divert the hydraulic flow and pressure to a right wing front gauge wheel bypass circuit 552. Each of the subsequent right wing front gauge wheel hydraulic cylinder three way solenoid valves with internal check valve 532B, 532C, 532D is configured to normally apply hydraulic flow and pressure received from the previous right wing front gauge wheel hydraulic cylinders 540A, 540B, 540C, respectively, to its own right wing front gauge wheel hydraulic cylinder 540B, 540C, 540D, respectively. Upon energization, each of the subsequent right wing front gauge wheel hydraulic cylinder three way solenoid valves with internal check valves 532B, 532C, 532D is configured to apply hydraulic flow and pressure received from right wing front gauge wheel bypass circuit 552 to its own right wing front gauge wheel hydraulic cylinder 540B, 540C, 540D, respectively.

In this way, the actuation of the right wing front gauge wheel hydraulic cylinders 540A, 540B, 540C, and 540D may be coordinated by leaving the right wing front gauge wheel hydraulic cylinder three way solenoid valves 532A, 532B, 532C, and 532D de-energized so that displacement of each of right wing front gauge wheel hydraulic cylinders 540A, 540B, and 540C forces hydraulic fluid into each of subsequent right wing front gauge wheel hydraulic cylinders 540B, 540C, and 540D, respectively, resulting in coordinated motion. The use of right wing front gauge wheel hydraulic cylinder three way solenoid valves with internal check valves 532A, 532B, 532C, and 532D reduces leakage and minimizes the number of adjustments of right wing front gauge wheel hydraulic cylinders 540A, 540B, 540C, and 540D are needed to maintain the depth of the cultivator shanks 36 on the main shank frame 28, right inner wing front shank frame 66B, right middle wing front shank frame 66D, and right outer wing front shank frame 66F. When it is desired to bypass adjustment of right wing front gauge wheel hydraulic cylinder 540B, right wing front gauge wheel hydraulic cylinder three way solenoid valves 532A and 532B are energized, thereby bypassing right wing front gauge wheel hydraulic cylinder 540A and actuating remaining right wing front gauge wheel hydraulic cylinders 540B, 540C, and 540D. Similarly, if it is desired to bypass adjustment of right wing front gauge wheel hydraulic cylinders 540A and 540B, right wing front gauge wheel hydraulic cylinder three way solenoid valves 532A and 532C are energized, thereby bypassing right wing front gauge wheel hydraulic cylinders 540A and 540B, and actuating remaining right wing front gauge wheel hydraulic cylinders 540C and 540D. If it is desired to bypass adjustment of right wing front gauge wheel hydraulic cylinders 540A, 540B, and 540C, right wing front gauge wheel hydraulic cylinder three way solenoid valves 532A and 532D are energized, thereby bypassing right wing front gauge wheel hydraulic cylinders 540A, 540B, and 540C, and actuating remaining right wing front gauge wheel hydraulic cylinder 540D.

Similarly, the left wing front gauge wheel hydraulic subsystem 504 has at least one left wing front gauge wheel hydraulic cylinder 542, four being illustrated in the embodiment of the invention shown in FIG. 5, as a non-limiting example, each of which is selectively supplied with hydraulic flow and pressure using a left wing front gauge wheel hydraulic cylinder three way solenoid valve with internal check valve 534. Left wing front gauge wheel hydraulic cylinder 542A may correspond to hydraulic cylinder 62 actuating the gauge wheel assembly 56 on the forward left corner of the main shank frame 28 shown in FIG. 1. Left wing front gauge wheel hydraulic cylinders 542B, 542C, and 542D may correspond to hydraulic cylinders 64 actuating the gauge wheel assemblies 70 on left inner wing front shank frame 66A, left middle wing front shank frame 66C, and left outer wing front shank frame 66E, respectively, shown in FIG. 1. Alternately, each of the left wing front gauge wheel hydraulic cylinders 542A, 542B, 542C, and 542D may correspond to hydraulic cylinders 64 actuating gauge wheel assemblies 70 on left wing shank frames. Left wing front gauge wheel hydraulic cylinders 542A, 542B, 542C, and 542D are used to control the depth of the cultivator shanks 36 on the main shank frame 28, right inner wing front shank frame 66B, right middle wing front shank frame 66D, and right outer wing front shank frame 66F.

The first left wing front gauge wheel hydraulic cylinder three way solenoid valve with internal check valve 534A shown in FIG. 5 is configured to normally apply hydraulic flow and pressure received from the fourth solenoid operated normally closed two way poppet valve 530 to the left wing front gauge wheel hydraulic cylinder 542A, and upon energization to divert the hydraulic flow and pressure to a left wing front gauge wheel bypass circuit 554. Each of the subsequent left wing front gauge wheel hydraulic cylinder three way solenoid valves with internal check valves 534B, 534C, 534D is configured to normally apply hydraulic flow and pressure received from the previous left wing front gauge wheel hydraulic cylinders 542A, 542B, 542C, respectively, to its own left wing front gauge wheel hydraulic cylinder 542B, 542C, 542D, respectively. Upon energization, each of the subsequent left wing front gauge wheel hydraulic cylinder three way solenoid valves with internal check valves 534B, 534C, 534D is configured to apply hydraulic flow and pressure received from left wing front gauge wheel bypass circuit 554 to its own left wing front gauge wheel hydraulic cylinder 542B, 542C, 542D, respectively.

In this way, the actuation of the left wing front gauge wheel hydraulic cylinders 542A, 542B, 542C, and 542D may be coordinated by leaving the left wing front gauge wheel hydraulic cylinder three way solenoid valves 534A, 534B, 534C, and 534D de-energized so that displacement of each of left wing front gauge wheel hydraulic cylinders 542A, 542B, and 542C forces hydraulic fluid into each of subsequent left wing front gauge wheel hydraulic cylinders 542B, 542C, and 542D, respectively, resulting in coordinated motion. The use of left wing front gauge wheel hydraulic cylinder three way solenoid valves with internal check valves 534A, 534B, 534C, and 534D reduces leakage and minimizes the number of adjustments of left wing front gauge wheel hydraulic cylinders 542A, 542B, and 542D are needed to maintain the depth of the cultivator shanks 36 on the main shank frame 28, left inner wing front shank frame 66A, left middle wing front shank frame 66C, and left outer wing front shank frame 66E. When it is desired to bypass adjustment of left wing front gauge wheel hydraulic cylinder 542A, left wing front gauge wheel hydraulic cylinder three way solenoid valves 534A and 534B are energized, thereby bypassing left wing front gauge wheel hydraulic cylinder 542A and actuating remaining left wing front gauge wheel hydraulic cylinders 542B, 542C, and 542D. Similarly, if it is desired to bypass adjustment of left wing front gauge wheel hydraulic cylinders 542A and 542B, left wing front gauge wheel hydraulic cylinder three way solenoid valves 534A and 534C are energized, thereby bypassing left wing front gauge wheel hydraulic cylinders 542A and 542B, and actuating remaining left wing front gauge wheel hydraulic cylinders 542C and 542D. If it is desired to bypass adjustment of left wing front gauge wheel hydraulic cylinders 542A, 542B, and 542C, left wing front gauge wheel hydraulic cylinder three way solenoid valves 534A and 534D are energized, thereby bypassing left wing front gauge wheel hydraulic cylinders 542A, 542B, and 542C, and actuating remaining left wing front gauge wheel hydraulic cylinder 542D.

Similarly, the right wing rear lift wheel hydraulic subsystem 506 has at least one right wing rear lift wheel hydraulic cylinder 544, four being illustrated in the embodiment of the invention shown in FIG. 5, as a non-limiting example, each of which is selectively supplied with hydraulic flow and pressure using a right wing rear lift wheel hydraulic cylinder three way solenoid valve 536. Right wing rear lift wheel hydraulic cylinder 544A may correspond to a right hand hydraulic cylinder 54 actuating the rear lift wheels 52 on an embodiment wherein there are at least two such hydraulic cylinders 54 actuating the rear lift wheels 52 independently. Right wing rear lift wheel hydraulic cylinders 544B, 544C, and 544D may correspond to hydraulic cylinders 60 actuating wing lift wheels 53 on right inner wing section 14B, right middle wing section 16B, and right outer wing section 18B, respectively, shown in FIG. 1. Alternately, each of the right wing rear lift wheel hydraulic cylinders 544A, 544B, 544C, and 544D may correspond to hydraulic cylinders 60 actuating lift wheels 53 on right wing sections 14B, 16B, 18B. Right wing rear lift wheel hydraulic cylinders 544A, 544B, 544C, and 544D are used to control the depth of the cultivator shanks 36 and spring tooth drags 32 attached to the rear auxiliary implements 30 and 78.

The first right wing rear lift wheel hydraulic cylinder three way solenoid valve 536A shown in FIG. 5 is configured to normally apply hydraulic flow and pressure received from the first solenoid operated normally closed two way poppet valve 524 to the right wing rear lift wheel hydraulic cylinder 544A, and upon energization to divert the hydraulic flow and pressure to a right wing rear lift wheel bypass circuit 560. Each of the subsequent right wing rear lift wheel hydraulic cylinder three way solenoid valves 536B, 536C, 536D is configured to normally apply hydraulic flow and pressure received from the previous right wing rear lift wheel hydraulic cylinders 544A, 544B, 544C, respectively, to its own right wing rear lift wheel hydraulic cylinders 544B, 544C, 544D, respectively. Upon energization, each of the subsequent right wing rear lift wheel hydraulic cylinder three way solenoid valves 536B, 536C, 536D is configured to apply hydraulic flow and pressure received from right wing rear lift wheel bypass circuit 560 via respective right wing rear lift wheel bypass valve 548A, 548B, 548C, respectively, to its own right wing rear lift wheel hydraulic cylinders 544B, 544C, 544D, respectively.

In this way, the actuation of the right wing rear lift wheel hydraulic cylinders 544A, 544B, 544C, and 544D may be coordinated by leaving the right wing rear lift wheel hydraulic cylinder three way solenoid valves 536A, 536B, 536C, and 536D de-energized so that displacement of each of right wing rear lift wheel hydraulic cylinders 544A, 544B, and 544C forces hydraulic fluid into each of subsequent right wing rear lift wheel hydraulic cylinders 544B, 544C, and 544D, respectively, resulting in coordinated motion. When it is desired to bypass adjustment of right wing rear lift wheel hydraulic cylinder 544A, right wing rear lift wheel hydraulic cylinder three way solenoid valves 536A and 536B are energized, along with right wing rear lift wheel bypass valve 548A, thereby bypassing right wing rear lift wheel hydraulic cylinder 544A and actuating remaining right wing rear lift wheel hydraulic cylinders 544B, 544C, and 544D. Similarly if it is desired to bypass adjustment of right wing rear lift wheel hydraulic cylinders 544A and 544B, right wing rear lift wheel hydraulic cylinder three way solenoid valves 536A and 536C are energized, along with right wing rear lift wheel bypass valve 548B, thereby bypassing right wing rear lift wheel hydraulic cylinders 544A and 544B and actuating remaining right wing rear lift wheel hydraulic cylinders 544C and 544D. Similarly if it is desired to bypass adjustment of right wing rear lift wheel hydraulic cylinders 544A, 544B, and 544C, right wing rear lift wheel hydraulic cylinder three way solenoid valves 536A and 536D are energized, along with right wing rear lift wheel bypass valve 548C, thereby bypassing right wing rear lift wheel hydraulic cylinders 544A, 544B, and 544C, and actuating remaining right wing rear lift wheel hydraulic cylinder 544D. Additionally, the right wing rear lift wheel bypass valves 548A, 548B, and 548C may assist in limiting leakage from right wing rear lift wheel hydraulic cylinder three way solenoid valves 536B, 536C, and 536D.

Similarly, the left wing rear lift wheel hydraulic subsystem 508 has at least one left wing rear lift wheel hydraulic cylinder 546, four being illustrated in the embodiment of the invention shown in FIG. 5, as a non-limiting example, each of which is selectively supplied with hydraulic flow and pressure using a left wing rear lift wheel hydraulic cylinder three way solenoid valve 538. Left wing rear lift wheel hydraulic cylinder 546A may correspond to a left hand hydraulic cylinder 54 actuating the rear lift wheels 52 on an embodiment wherein there are at least two such hydraulic cylinders 54 actuating the rear lift wheels 52 independently. Left wing rear lift wheel hydraulic cylinders 546B, 546C, and 546D may correspond to hydraulic cylinders 60 actuating wing lift wheels 53 on left inner wing section 14A, left middle wing section 16A, and left outer wing section 18A, respectively, shown in FIG. 1. Alternately, each of the left wing rear lift wheel hydraulic cylinders 546A, 546B, 546C, and 546D may correspond to hydraulic cylinders 60 actuating lift wheels 53 on left wing sections 14A, 16A, 18A. Left wing rear lift wheel hydraulic cylinders 546A, 546B, 546C, and 546D are used to control the depth of the cultivator shanks 36 and spring tooth drags 32 attached to the rear auxiliary implements 30 and 78.

The first left wing rear lift wheel hydraulic cylinder three way solenoid valve 538A shown in FIG. 5 is configured to normally apply hydraulic flow and pressure received from the second solenoid operated normally closed two way poppet valve 526 to the left wing rear lift wheel hydraulic cylinder 546A, and upon energization to divert the hydraulic flow and pressure to a left wing rear lift wheel bypass circuit 562. Each of the subsequent left wing rear lift wheel hydraulic cylinder three way solenoid valves 538B, 538C, 538D is configured to normally apply hydraulic flow and pressure received from the previous left wing rear lift wheel hydraulic cylinders 546A, 546B, 546C, respectively, to its own left wing rear lift wheel hydraulic cylinders 546B, 546C, 546D, respectively. Upon energization, each of the subsequent left wing rear lift wheel hydraulic cylinder three way solenoid valves 538B, 538C, 538D is configured to apply hydraulic flow and pressure received from left wing rear lift wheel bypass circuit 562 via respective left wing rear lift wheel bypass valve 550A, 550B, 550B, respectively, to its own left wing rear lift wheel hydraulic cylinders 546B, 546C, 546D, respectively.

In this way, the actuation of the left wing rear lift wheel hydraulic cylinders 546A, 546B, 546C, and 546D may be coordinated by leaving the left wing rear lift wheel hydraulic cylinder three way solenoid valves 538A, 538B, 538C, and 538D de-energized so that displacement of each of left wing rear lift wheel hydraulic cylinders 546A, 546B, and 546C forces hydraulic fluid into each of subsequent left wing rear lift wheel hydraulic cylinders 546B, 546C, and 546D, respectively, resulting in coordinated motion. When it is desired to bypass adjustment of left wing rear lift wheel hydraulic cylinder 546A, left wing rear lift wheel hydraulic cylinder three way solenoid valves 538A and 538B are energized, along with left wing rear lift wheel bypass valve 550A, thereby bypassing left wing rear lift wheel hydraulic cylinder 546A and actuating remaining left wing rear lift wheel hydraulic cylinders 546B, 546C, and 546D. Similarly, if it is desired to bypass adjustment of left wing rear lift wheel hydraulic cylinders 546A and 546B, left wing rear lift wheel hydraulic cylinder three way solenoid valves 538A and 538C are energized, along with left wing rear lift wheel bypass valves 550B, thereby bypassing left wing rear lift wheel hydraulic cylinders 546A and 546B and actuating remaining left wing rear lift wheel hydraulic cylinders 546C and 546D. Similarly, if it is desired to bypass adjustment of left wing rear lift wheel hydraulic cylinders 546A, 546B, and 546C, left wing rear lift wheel hydraulic cylinder three way solenoid valves 538A and 538D are energized, along with left wing rear lift wheel bypass valve 550C, thereby bypassing left wing rear lift wheel hydraulic cylinders 546A, 546B, and 546C, and actuating remaining left wing rear lift wheel hydraulic cylinder 546D. Additionally, the left wing rear lift wheel bypass valves 550A, 550B, and 550C may assist in limiting leakage from left wing rear lift wheel hydraulic cylinder three way solenoid valves 538B, 538C, and 538D.

Note that for illustration purposes, all hydraulic cylinders shown in FIG. 5 are shown as acting in extension, although as such hydraulic cylinders may instead act in retraction. Therefore, it is contemplated that any cylinder shown in the hydraulic diagram of FIG. 5 may be reversed in its direction of action, and still be within the scope of the present invention. Subsequent to right wing front gauge wheel hydraulic cylinder 540D, left wing front gauge wheel hydraulic cylinder 542D, right wing rear lift wheel hydraulic cylinder 544D, and left wing rear lift wheel hydraulic cylinder 546D, the hydraulic flow returns from tillage implement hydraulic system 500 via manifold 558.

Each of the first solenoid operated normally closed two way poppet bypass valve 514, the second solenoid operated normally closed two way poppet bypass valve 518, the third solenoid operated normally closed two way poppet bypass valve 522, the first solenoid operated normally closed two way poppet valve 524, the second solenoid operated normally closed two way poppet valve 526, the third solenoid operated normally closed two way poppet valve 528, and the fourth solenoid operated normally closed two way poppet valve 530, the right wing front gauge wheel hydraulic cylinder three way solenoid valves 532A, 532B, 532C, and 532D, the left wing front gauge hydraulic cylinder three way solenoid valves 534A, 534B, 534C, and 534D, the right wing rear lift wheel hydraulic cylinder three way solenoid valves 536A, 536B, 536C, and 536D, the left wing rear lift wheel hydraulic cylinder three way solenoid valves 538A, 538B, 538C, and 538D, the right wing rear lift wheel bypass valves 548A, 548B, and 548C, and the left wing rear lift wheel bypass valves 550A, 550B, and 550C, are connected to a controller 564.

The controller 564 is operable to selectively coordinate the hydraulic cylinders of the right wing front gauge wheel hydraulic subsystem 502, the left wing front gauge wheel hydraulic subsystem 504, the right wing rear lift wheel hydraulic subsystem 506, and the left wing rear lift wheel hydraulic subsystem 508 using the first solenoid operated normally closed two way poppet bypass valve 514, the second solenoid operated normally closed two way poppet bypass valve 518, the third solenoid operated normally closed two way poppet bypass valve 522, the first solenoid operated normally closed two way poppet valve 524, the second solenoid operated normally closed two way poppet valve 526, the third solenoid operated normally closed two way poppet valve 528, and the fourth solenoid operated normally closed two way poppet valve 530, as described previously.

The controller 564 is further operable to selectively coordinate the right wing front gauge wheel hydraulic cylinders 540A, 540B, 540C, and 540D using the right wing front gauge wheel hydraulic cylinder three way solenoid valves 532A, 532B, 532C, and 532D, as described previously. The controller 564 is further operable to selectively coordinate the left wing front gauge wheel hydraulic cylinders 542A, 542B, 542C, and 542D using the left wing front gauge hydraulic cylinder three way solenoid valves 534A, 534B, 534C, and 534D, as described previously. The controller 564 is further operable to selectively coordinate the right wing rear lift wheel hydraulic cylinders 544A, 544B, 544C, and 544D using the right wing rear lift wheel hydraulic cylinder three way solenoid valves 536A, 536B, 536C, and 536D, and the right wing rear lift wheel bypass valves 548A, 548B, and 548C, as described previously. The controller 564 is further operable to selectively coordinate the left wing rear lift wheel hydraulic cylinders 546A, 546B, 546C, and 546D using the left wing rear lift wheel hydraulic cylinder three way solenoid valves 538A, 538B, 538C, and 538D, and the left wing rear lift wheel bypass valves 550A, 550B, and 550C, as described previously.

Each of the right wing front gauge wheel hydraulic cylinders 540A, 540B, 540C, and 540D is provided with a right wing front gauge wheel hydraulic cylinder displacement detecting device 566A, 566B, 566C, and 566D, respectively. The right wing front gauge wheel hydraulic cylinder displacement detecting devices 566A, 566B, 566C, and 566D are each connected to the controller 564 (connection not shown for simplicity), and provide signals proportional to the displacement of the right wing front gauge wheel hydraulic cylinders 540A, 540B, 540C, 540D. Each of the left wing front gauge wheel hydraulic cylinders 542A, 542B, 542C, and 542D is provided with a left wing front gauge wheel hydraulic cylinder displacement detecting device 568A, 568B, 568C, and 568D, respectively. The left wing front gauge wheel hydraulic cylinder displacement detecting devices 568A, 568B, 568C, and 568D are each connected to the controller 564 (connection not shown for simplicity), and provide signals proportional to the displacement of the left wing front gauge wheel hydraulic cylinders 542A, 542B, 542C, and 542D.

Each of the right wing rear lift wheel hydraulic cylinders 544A, 544B, 544C, and 544D is provided with a right wing rear lift wheel hydraulic cylinder displacement detecting device 570A, 570B, 570C, and 570D, respectively. The right wing rear lift wheel hydraulic cylinder displacement detecting devices 570A, 570B, 570C, and 570D are each connected to the controller 564 (connection not shown for simplicity), and provide signals proportional to the displacement of the right wing rear lift wheel hydraulic cylinders 544A, 544B, 544C, and 544D. Each of the left wing rear lift wheel hydraulic cylinders 546A, 546B, 456C, and 456D is provided with a left wing rear lift wheel hydraulic cylinder displacement detecting device 572A, 572B, 572C, and 572D, respectively. The left wing rear lift wheel hydraulic cylinder displacement detecting device 572A, 572B, 572C, and 572D are each connected to the controller 564 (connection not shown for simplicity), and provide signals proportional to the displacement of the left wing rear lift wheel hydraulic cylinders 546A, 546B, 546C, and 546D.

In addition to the displacement signal, a signal reflecting the rate of change of displacement, or $\Delta D/\Delta T$, may be provided by the hydraulic cylinder displacement detecting devices 566A, 566B, 566C, 566D, 568A, 568B, 568C, 568D, 570A, 570B, 570C, 570D, 572A, 572B, 572C, and 572D. A rheostat type of sensor is shown in FIG. 5, although any kind of sensor producing an output proportional to sensed displacement and/or rate of change of displacement may be used. As shown in FIG. 5, the hydraulic cylinder displacement detecting devices 566A, 566B, 566C, 566D, 568A, 568B, 568C, 568D, 570A, 570B, 570C, 570D, 572A, 572B, 572C, and 572D incorporate both displacement sensing and rate of change of displacement sensing functions, although individual sensors may be used for each of the displacement sensing and rate of change of displacement sensing functions.

The controller 564 may again calibrate the right wing front gauge wheel hydraulic cylinders 540A, 540B, 540C, and 540D, the left wing front gauge wheel hydraulic cylinders 542A, 542B, 542C, and 542D, the right wing rear lift wheel hydraulic cylinders 544A, 544B, 544C, and 544D, and the left wing rear lift wheel hydraulic cylinders 546A, 546B, 546C, and 546D by first extending each to its maximum length, similar to the controllers 360 and 460 in FIGS. 3 and 4. Individual readings are then taken from the hydraulic cylinder displacement detecting devices 566A, 566B, 566C, 566D, 568A, 568B, 568C, 568D, 570A, 570B, 570C, 570D, 572A, 572B, 572C, and 572D. The agricultural tillage implement 10 is then lowered so that the tools, in this embodiment the cultivator shanks 36, just touch the level surface. Once this condition is achieved, individual readings are again taken from the hydraulic cylinder displacement detecting devices 566A, 566B, 566C, 566D, 568A, 568B, 568C, 568D, 570A, 570B, 570C, 570D, 572A, 572B, 572C, and 572D. These displacement signals are then stored in the controller 564, and provide the synchronized set point for the displacement detecting devices 566A, 566B, 566C, 566D, 568A, 568B, 568C, 568D, 570A, 570B, 570C, 570D, 572A, 572B, 572C, and 572D. Alternately, other reference planes than that defined by contact between the tools and a level surface may be used.

As with the controllers 360 and 460, the controller 564 may periodically during the operation of the agricultural tillage implement 10, take the readings of the hydraulic cylinder displacement detecting devices 566A, 566B, 566C, 566D, 568A, 568B, 568C, 568D, 570A, 570B, 570C, 570D, 572A, 572B, 572C, and 572D and, if they deviate from the set point initially established, the controller 564 corrects the appropriate hydraulic cylinder 540A, 540B, 540C, 540D, 542A, 542B, 542C, 542D, 544A, 544B, 544C, 544D, 546A, 546B, 546C, or 546D to achieve the intended set point. This may be done independently of other hydraulic cylinders using the methods described previously. The agricultural tillage implement 10 is then able to provide accurate depth of penetration of the tools, in this embodiment the cultivator shanks 36.

As before, the agricultural implement 10 may additionally be adjusted in the field. Again, the operator prepares a test run into the soil in a field and then measures the depth of the penetration of the tools. To the extent that it is necessary to make a minor adjustment, the individual hydraulic cylinder that is out of sync with the remaining hydraulic cylinders is adjusted and a new set point is established as the level uniform plane. This ensures that field conditions such as wheel loading and other factors have a minimal and easily correctable impact on the tillage operation. In addition, the hydraulic cylinders are corrected for the differential rate of displacement change $\Delta D/\Delta T$ so that the entry of the tools is uniform at the beginning of the field and the withdrawal is uniform at the end of the field. The process of recalibration may be made automatic so that it does not interfere with the immediate operator directed tillage over a field and preparing the soil.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a main frame section;
   a left wing section and a right wing section coupled with said main frame section;
   at least one first left rear lift wheel connected to one of said main frame section and said left wing section and actuated by a first left rear lift wheel hydraulic cylinder, and at least one additional left rear lift wheel connected to said left wing section and actuated by at least one additional left rear lift wheel hydraulic cylinder;
   at least one first right rear lift wheel connected to one of said main frame section and said right wing section and actuated by a first right rear lift wheel hydraulic cylinder, and at least one additional right rear lift wheel connected to said right wing section and actuated by at least one additional right rear lift wheel hydraulic cylinder;
   a hydraulic system having at least one left hydraulic circuit supplying hydraulic pressure and flow to at least one left wing hydraulic subsystem for actuating said at least one first left rear lift wheel and said at least one additional left rear lift wheel, and at least one right hydraulic circuit supplying hydraulic pressure and flow to at least one right wing hydraulic subsystem for actuating said at least one first right rear lift wheel and said at least one additional right rear lift wheel;
   said at least one left wing hydraulic subsystem having a first left wing rear three way solenoid valve hydraulically connecting said first left rear lift wheel hydraulic cylinder to said at least one left hydraulic circuit and an additional left wing rear three way solenoid valve hydraulically connecting each additional left rear lift wheel hydraulic cylinder to the previous left rear lift wheel hydraulic cylinder, and a left wing rear bypass circuit hydraulically interconnecting each left wing rear three way solenoid valve;
   said at least one right wing hydraulic subsystem having a first right wing rear three way solenoid valve hydraulically connecting said first right rear lift wheel hydraulic cylinder to said at least one right hydraulic circuit and an additional right wing rear three way solenoid valve hydraulically connecting each additional right rear lift wheel hydraulic cylinder to the previous right rear lift wheel hydraulic cylinder, and a right wing rear bypass circuit hydraulically interconnecting each right wing rear three way solenoid valve;
   said three way solenoid valves and said bypass circuits functioning to selectively allow coordinated control and individual control of said lift wheels; and
   said hydraulic system having at least one hydraulic flow divider and combiner dividing hydraulic flow and pressure between said at least one left hydraulic circuit and said at least one right hydraulic circuit, said at least one hydraulic flow divider and combiner functioning to coordinate the motion of said left rear lift wheels and said right rear lift wheels,
   wherein at least one of said at least one left hydraulic circuit and said at least one right hydraulic circuit further comprises a solenoid operated normally closed two way poppet valve controlling said hydraulic pressure and flow supplied to said at least one left wing hydraulic subsystem or to said right wing hydraulic subsystem, respectively.

2. The agricultural tillage implement of claim 1, further comprising:
   at least one main implement connected to said main frame section;
   at least one left wing implement connected to said left wing section;
   at least one right wing implement connected to said right wing section;
   at least one first left front gauge wheel connected to one of said at least one main implement and said at least one left wing implement and actuated by a first left front gauge wheel hydraulic cylinder, and at least one additional left front gauge wheel connected to said at least one left wing implement and actuated by at least one additional left front gauge wheel hydraulic cylinder;
   at least one first right front gauge wheel connected to one of said at least one main implement and said at least one right wing implement and actuated by a first right front gauge wheel hydraulic cylinder, and at least one additional right front gauge wheel connected to said at least one right wing implement and actuated by at least one additional right front gauge wheel hydraulic cylinder;
   said at least one left hydraulic circuit supplying said at least one left wing hydraulic subsystem further comprises at least one left front hydraulic circuit supplying at least one left wing front hydraulic subsystem for actuating said at least one first left front gauge wheel and said at least one additional left front gauge wheel, and at least one left rear hydraulic circuit supplying at least one left wing rear hydraulic subsystem for actuating said at least one first left rear lift wheel and said at least one additional left rear lift wheel;
   said at least one left wing rear hydraulic subsystem having said first left wing rear three way solenoid valve hydraulically connecting said first left rear lift wheel hydraulic cylinder to said at least one left rear hydraulic circuit and said additional left wing rear three way solenoid valve hydraulically connecting each additional left rear lift wheel hydraulic cylinder to the previous left rear lift wheel hydraulic cylinder, and said left wing rear bypass circuit hydraulically interconnecting each left wing rear three way solenoid valve;
   said at least one left wing front hydraulic subsystem having a first left wing front three way solenoid valve hydraulically connecting said first left front gauge wheel hydraulic cylinder to said at least one left front hydraulic circuit and an additional left wing front three way solenoid valve hydraulically connecting each additional left front gauge wheel hydraulic cylinder to the previous left front gauge wheel hydraulic cylinder, and a left wing front bypass circuit hydraulically interconnecting each left wing front three way solenoid valve;

said at least one right hydraulic circuit supplying said at least one right wing hydraulic subsystem further comprises at least one right front hydraulic circuit supplying at least one right wing front hydraulic subsystem for actuating said at least one first right front gauge wheel and said at least one additional right front gauge wheel, and at least one right rear hydraulic circuit supplying at least one right wing rear hydraulic subsystem for actuating said at least one first right rear lift wheel and said at least one additional right rear lift wheel;

said at least one right wing rear hydraulic subsystem having said first right wing rear three way solenoid valve hydraulically connecting said first right rear lift wheel hydraulic cylinder to said at least one right rear hydraulic circuit and said additional right wing rear three way solenoid valve hydraulically connecting each additional right rear lift wheel hydraulic cylinder to the previous right rear lift wheel hydraulic cylinder, and said right wing rear bypass circuit hydraulically interconnecting each right wing rear three way solenoid valve; and said at least one right wing front hydraulic subsystem having a first right wing front three way solenoid valve hydraulically connecting said first right front gauge wheel hydraulic cylinder to said at least one right front hydraulic circuit and an additional right wing front three way solenoid valve hydraulically connecting each additional right front gauge wheel hydraulic cylinder to the previous right front gauge wheel hydraulic cylinder, and a right wing front bypass circuit hydraulically interconnecting each right wing front three way solenoid valve.

3. The agricultural tillage implement of claim 2, wherein:
said at least one hydraulic flow divider and combiner further comprises:
a first hydraulic flow divider and combiner dividing hydraulic flow and pressure between said left front hydraulic circuit and said right front hydraulic circuit, said first hydraulic flow divider and combiner functioning to coordinate the motion of said left front gauge wheels and said right front gauge wheels;
a second hydraulic flow divider and combiner dividing hydraulic flow and pressure between said left rear hydraulic circuit and said right rear hydraulic circuit, said second hydraulic flow divider and combiner functioning to coordinate the motion of said left rear lift wheels and said right rear lift wheels; and
a third hydraulic flow divider and combiner dividing hydraulic flow and pressure between said first hydraulic flow divider and combiner and said second hydraulic flow divider and combiner, said third hydraulic flow divider and combiner functioning to coordinate the motion of said front gauge wheels and said rear lift wheels.

4. The agricultural tillage implement of claim 3, wherein:
said third hydraulic flow divider and combiner further dividing hydraulic flow and pressure between said second hydraulic flow divider and combiner and said first hydraulic flow divider and combiner in a 60/40 ratio.

5. The agricultural tillage implement of claim 3, further comprising:
a first solenoid operated normally closed two way poppet bypass valve selectively interconnecting said left front hydraulic circuit and said right front hydraulic circuit subsequent to said first hydraulic flow divider and combiner;
a second solenoid operated normally closed two way poppet bypass valve selectively interconnecting said left rear hydraulic circuit and said right rear hydraulic circuit subsequent to said second hydraulic flow divider and combiner;
a third solenoid operated normally closed two way poppet bypass valve selectively interconnecting hydraulic pressure and flow supplying said first hydraulic flow divider and combiner and said second hydraulic flow divider and combiner subsequent to said third hydraulic flow divider and combiner; and
said first, second, and third solenoid operated normally closed two way poppet bypass valves functioning to allow the coordinated motion of said gauge wheels and said lift wheels to be overridden.

6. The agricultural tillage implement of claim 5, wherein:
at least one of said bypass circuits is further provided with at least one bypass valve for at least one of said three way solenoid valves, each bypass valve hydraulically connecting said at least one three way solenoid valve with said bypass circuit.

7. The agricultural tillage implement of claim 1, wherein:
at least one of said three way solenoid valves further comprises a three way solenoid valve with internal check valve.

8. The agricultural tillage implement of claim 2, wherein:
each of said left rear lift wheel hydraulic cylinders, said right rear lift wheel hydraulic cylinders, said left front gauge wheel hydraulic cylinders, and said right front gauge wheel hydraulic cylinders being provided with a hydraulic cylinder displacement detecting device, said hydraulic cylinder displacement detecting devices producing signals proportional to the displacement of said hydraulic cylinders.

9. The agricultural tillage implement of claim 8, wherein:
said hydraulic cylinder displacement detecting devices further producing signals reflecting the rate of change of the displacement of the hydraulic cylinders.

10. A hydraulic system for an agricultural tillage implement having a main frame section, a left wing section and a right wing section coupled with the main frame section, at least one first left rear lift wheel connected to one of the main frame section and the left wing section, at least one additional left rear lift wheel connected to the left wing section, at least one first right rear lift wheel connected to one of the main frame section and the right wing section, and at least one additional right rear lift wheel connected to the right wing section, at least one main implement connected to the main frame section, at least one left wing implement connected to the left wing section, at least one right wing implement connected to the right wing section, at least one first left front gauge wheel connected to one of the at least one main implement and the at least one left wing implement, at least one additional left front gauge wheel connected to the at least one left wing implement, at least one first right front gauge wheel connected to one of the at least one main implement and the at least one right wing implement, and at least one additional right front gauge wheel connected to the at least one right wing implement, comprising:

a first left rear lift wheel hydraulic cylinder actuating the at least one first left rear lift wheel;
an additional left rear lift wheel hydraulic cylinder actuating each of the at least one additional left rear lift wheels;
a first right rear lift wheel hydraulic cylinder actuating the at least one first right rear lift wheel;
an additional right rear lift wheel hydraulic cylinder actuating each of the at least one additional right rear lift wheels;
at least one left hydraulic circuit supplying hydraulic pressure and flow to at least one left wing hydraulic subsystem for actuating said first left rear lift wheel hydraulic cylinder and said at least one additional left rear lift wheel hydraulic cylinder, and at least one right hydraulic circuit supplying hydraulic pressure and flow to at least one right wing hydraulic subsystem for actuating said first right rear lift wheel hydraulic cylinder and said at least one additional right rear lift wheel hydraulic cylinder;
said at least one left wing hydraulic subsystem having a first left wing rear three way solenoid valve hydraulically connecting said first left rear lift wheel hydraulic cylinder to said at least one left hydraulic circuit and an additional left wing rear three way solenoid valve hydraulically connecting each additional left rear lift wheel hydraulic cylinder to the previous left rear lift wheel hydraulic cylinder, and a left wing rear bypass circuit hydraulically interconnecting each left wing rear three way solenoid valve;
said at least one right wing hydraulic subsystem having a first right wing rear three way solenoid valve hydraulically connecting said first right rear lift wheel hydraulic cylinder to said at least one right hydraulic circuit and an additional right wing rear three way solenoid valve hydraulically connecting each additional right rear lift wheel hydraulic cylinder to the previous right rear lift wheel hydraulic cylinder, and a right wing rear bypass circuit hydraulically interconnecting each right wing rear three way solenoid valve;
said three way solenoid valves and said bypass circuits functioning to selectively allow coordinated control and individual control of said lift wheels; and
said hydraulic system having at least one hydraulic flow divider and combiner dividing hydraulic flow and pressure between said at least one left hydraulic circuit and said at least one right hydraulic circuit, said at least one hydraulic flow divider and combiner functioning to coordinate the motion of said left rear lift wheel hydraulic cylinders and said right rear lift wheel hydraulic cylinders,
wherein at least one of said at least one left hydraulic circuit and said at least one right hydraulic circuit further comprises a solenoid operated normally closed two way poppet valve controlling said hydraulic pressure and flow supplied to said at least one left wing hydraulic subsystem or to said right wing hydraulic subsystem, respectively.

11. The hydraulic system of claim 10, further comprising:
a first left front gauge wheel hydraulic cylinder actuating the at least one first left front gauge wheel;
an additional left front gauge wheel hydraulic cylinder actuating each of the at least one additional left front gauge wheels;
a first right front gauge wheel hydraulic cylinder actuating the at least one first right front gauge wheel;
an additional right front gauge wheel hydraulic cylinder actuating each of the at least one additional right front gauge wheels;
said at least one left hydraulic circuit supplying said at least one left wing hydraulic subsystem further comprises at least one left front hydraulic circuit supplying at least one left wing front hydraulic subsystem for actuating the at least one first left front gauge wheel and the at least one additional left front gauge wheel, and at least one left rear hydraulic circuit supplying at least one left wing rear hydraulic subsystem for actuating the at least one first left rear lift wheel and the at least one additional left rear lift wheel;
said at least one left wing rear hydraulic subsystem having said first left wing rear three way solenoid valve hydraulically connecting said first left rear lift wheel hydraulic cylinder to said at least one left rear hydraulic circuit and said additional left wing rear three way solenoid valve hydraulically connecting each additional left rear lift wheel hydraulic cylinder to the previous left rear lift wheel hydraulic cylinder, and said left wing rear bypass circuit hydraulically interconnecting each left wing rear three way solenoid valve;
said at least one left wing front hydraulic subsystem having a first left wing front three way solenoid valve hydraulically connecting said first left front gauge wheel hydraulic cylinder to said at least one left front hydraulic circuit and an additional left wing front three way solenoid valve hydraulically connecting each additional left front gauge wheel hydraulic cylinder to the previous left front gauge wheel hydraulic cylinder, and a left wing front bypass circuit hydraulically interconnecting each left wing front three way solenoid valve;
said at least one right hydraulic circuit supplying said at least one right wing hydraulic subsystem further comprises at least one right front hydraulic circuit supplying at least one right wing front hydraulic subsystem for actuating the at least one first right front gauge wheel and the at least one additional right front gauge wheel, and at least one right rear hydraulic circuit supplying at least one right wing rear hydraulic subsystem for actuating the at least one first right rear lift wheel and the at least one additional right rear lift wheel;
said at least one right wing rear hydraulic subsystem having said first right wing rear three way solenoid valve hydraulically connecting said first right rear lift wheel hydraulic cylinder to said at least one right rear hydraulic circuit and said additional right wing rear three way solenoid valve hydraulically connecting each additional right rear lift wheel hydraulic cylinder to the previous right rear lift wheel hydraulic cylinder, and said right wing rear bypass circuit hydraulically interconnecting each right wing rear three way solenoid valve; and
said at least one right wing front hydraulic subsystem having a first right wing front three way solenoid valve hydraulically connecting said first right front gauge wheel hydraulic cylinder to said at least one right front hydraulic circuit and an additional right wing front three way solenoid valve hydraulically connecting each additional right front gauge wheel hydraulic cylinder to the previous right front gauge wheel hydraulic cylinder, and a right wing front bypass circuit hydraulically interconnecting each right wing front three way solenoid valve.

12. The hydraulic system of claim 11, wherein:
said at least one hydraulic flow divider and combiner further comprises:
a first hydraulic flow divider and combiner dividing hydraulic flow and pressure between said left front hydraulic circuit and said right front hydraulic circuit, said first hydraulic flow divider and combiner functioning to coordinate the motion of the left front gauge wheels and the right front gauge wheels;
a second hydraulic flow divider and combiner dividing hydraulic flow and pressure between said left rear hydraulic circuit and said right rear hydraulic circuit, said second hydraulic flow divider and combiner functioning to coordinate the motion of the left rear lift wheels and the right rear lift wheels; and
a third hydraulic flow divider and combiner dividing hydraulic flow and pressure between said first hydraulic flow divider and combiner and said second hydraulic flow divider and combiner, said third hydraulic flow divider and combiner functioning to coordinate the motion of the front gauge wheels and the rear lift wheels.

13. The agricultural tillage implement of claim 12, wherein:
said third hydraulic flow divider and combiner further dividing hydraulic flow and pressure between said second hydraulic flow divider and combiner and said first hydraulic flow divider and combiner in a 60/40 ratio.

14. The hydraulic system of claim 12, further comprising:
a first solenoid operated normally closed two way poppet bypass valve selectively interconnecting said left front hydraulic circuit and said right front hydraulic circuit subsequent to said first hydraulic flow divider and combiner;
a second solenoid operated normally closed two way poppet bypass valve selectively interconnecting said left rear hydraulic circuit and said right rear hydraulic circuit subsequent to said second hydraulic flow divider and combiner;
a third solenoid operated normally closed two way poppet bypass valve selectively interconnecting hydraulic pressure and flow supplying said first hydraulic flow divider and combiner and said second hydraulic flow divider and combiner subsequent to said third hydraulic flow divider and combiner; and
said first, second, and third solenoid operated normally closed two way poppet bypass valves functioning to allow the coordinated motion of the front gauge wheels and the rear lift wheels to be overridden.

15. The hydraulic system of claim 14, wherein:
at least one of said bypass circuits is further provided with at least one bypass valve for at least one of said three way solenoid valves, each bypass valve hydraulically connecting said at least one three way solenoid valve with said bypass circuit.

16. The hydraulic system of claim 10, wherein:
at least one of said three way solenoid valves further comprises a three way solenoid valve with internal check valve.

17. The hydraulic system of claim 11, wherein:
each of said left rear lift wheel hydraulic cylinders, said right rear lift wheel hydraulic cylinders, said left front gauge wheel hydraulic cylinders, and said right front gauge wheel hydraulic cylinders being provided with a hydraulic cylinder displacement detecting device, said hydraulic cylinder displacement detecting devices producing signals proportional to the displacement of said hydraulic cylinders.

18. The hydraulic system of claim 17, wherein:
said hydraulic cylinder displacement detecting devices further producing signals reflecting the rate of change of the displacement of the hydraulic cylinders.

* * * * *